US010968131B2

(12) United States Patent
Takahashi et al.

(10) Patent No.: US 10,968,131 B2
(45) Date of Patent: Apr. 6, 2021

(54) METHOD FOR MANUFACTURING GLASS CONTAINER

(71) Applicant: KOA GLASS CO., LTD., Tokyo (JP)

(72) Inventors: Masahiro Takahashi, Ichikawa (JP); Shotaro Takahashi, Ichikawa (JP); Naomasa Saito, Ichikawa (JP)

(73) Assignee: KOA GLASS CO., LTD., Tokyo (JP)

( * ) Notice: Subject to any disclaimer, the term of this patent is extended or adjusted under 35 U.S.C. 154(b) by 168 days.

(21) Appl. No.: 16/082,278

(22) PCT Filed: Jan. 26, 2017

(86) PCT No.: PCT/JP2017/002710
§ 371 (c)(1),
(2) Date: Sep. 5, 2018

(87) PCT Pub. No.: WO2017/163597
PCT Pub. Date: Sep. 28, 2017

(65) Prior Publication Data
US 2019/0084861 A1 Mar. 21, 2019

(30) Foreign Application Priority Data
Mar. 25, 2016 (JP) .............................. JP2016-061256

(51) Int. Cl.
*C03B 9/32* (2006.01)
*C03B 9/14* (2006.01)
(Continued)

(52) U.S. Cl.
CPC .............. *C03B 9/32* (2013.01); *B65D 1/0246* (2013.01); *C03B 9/14* (2013.01); *C03B 9/145* (2013.01);
(Continued)

(58) Field of Classification Search
CPC .. C03B 9/32; C03B 9/14; C03B 9/363; C03B 9/3663
See application file for complete search history.

(56) References Cited

U.S. PATENT DOCUMENTS 2,063,463 A * 12/1936 Rowe ..................... C03B 9/145
65/64
2,205,382 A 6/1940 Garwood
(Continued)

FOREIGN PATENT DOCUMENTS

DE 2446597 A1 * 4/1975 ........... C03B 9/3636
EP 2824085 A1 * 1/2015 ............... C03B 9/32
(Continued)

OTHER PUBLICATIONS

Denhams (https://denhams.com/lot/61/october-2014)—Results of auction held Oct. 2014.*
(Continued)

Primary Examiner — Jason L Lazorcik
(74) Attorney, Agent, or Firm — Yokoi & Co., U.S.A.; Toshiyuki Yokoi

(57) ABSTRACT

Provided is a method for manufacturing a glass container with which a glass container having a distinctively shaped inner space and excellent aesthetic appearance can be manufactured in good yield. The method for manufacturing a glass container includes steps (A) to (E). (A) A step of introducing a gob into a mold through a funnel. (B) A step of blowing air into the mold through the funnel, bringing a plunger disposed on a side opposite the side to which the funnel is fitted in contact with the gob, separating the plunger from the gob, and forming a recess on the surface of the gob. (C) A step of removing the funnel from the mold and fitting a baffle to the mold. (D) A step of blowing air from the plunger, and forming an inner space inside the gob with the recess as a starting point while simultaneously
(Continued)

forming an outer shape by pressing the outer side of the gob to a molding surface of the mold to obtain a glass container of the final shape. (E) A step of transferring the glass container of the final shape to a cooling mold and cooling the same.

5 Claims, 30 Drawing Sheets

(51) Int. Cl.
    *C03B 9/193*     (2006.01)
    *C03B 9/36*     (2006.01)
    *C03B 9/325*     (2006.01)
    *C03B 9/38*     (2006.01)
    *C03B 9/335*     (2006.01)
    *C03B 9/34*     (2006.01)
    *B65D 1/02*     (2006.01)
    *B65D 1/00*     (2006.01)

(52) U.S. Cl.
    CPC ............ *C03B 9/1936* (2013.01); *C03B 9/325* (2013.01); *C03B 9/335* (2013.01); *C03B 9/344* (2013.01); *C03B 9/3645* (2013.01); *C03B 9/3663* (2013.01); *C03B 9/3825* (2013.01); *C03B 9/3833* (2013.01); *C03B 9/3841* (2013.01); *C03B 9/3875* (2013.01); *B65D 1/00* (2013.01)

(56) References Cited

U.S. PATENT DOCUMENTS

| | | | | |
|---|---|---|---|---|
| 2,235,103 A | * | 3/1941 | Garwood | C03B 9/14 65/243 |
| 2,648,168 A | * | 8/1953 | Rowe | C03B 9/3663 65/76 |
| 3,171,729 A | * | 3/1965 | Andersen | C03B 9/3672 65/76 |
| 4,470,836 A | * | 9/1984 | Delgadillo | C03B 9/344 65/209 |
| 6,632,492 B1 | * | 10/2003 | Badin | C03B 9/32 215/371 |
| 2004/0079769 A1 | * | 4/2004 | Balzeau | C03B 9/31 222/568 |

FOREIGN PATENT DOCUMENTS

| | | | | | |
|---|---|---|---|---|---|
| EP | 3372562 A1 | * | 9/2018 | | C03B 9/32 |
| FR | 1374328 A | * | 10/1964 | | C03B 9/165 |
| FR | 2993879 A1 | * | 1/2014 | | B65D 1/0207 |
| JP | S61-247627 A | | 11/1986 | | |
| JP | H09-059031 A | | 3/1997 | | |
| JP | 2000-211930 A | | 8/2000 | | |
| JP | 2003-119036 A | | 4/2003 | | |
| WO | WO-2012120119 A1 | * | 9/2012 | | C03B 9/3663 |
| WO | WO-2017163597 A1 | * | 9/2017 | | C03B 9/145 |

OTHER PUBLICATIONS

Google.com log of reviews for the Zodax modern morocco glass perfume bottle CH-1426 (https://www.google.com/search?q=0721794120261&source=lmns&bih=1057&biw=1920&rlz=1C1GCEB_en&safe=off&hl=en&ved=2ahUKEwiDjZnTyqzpAhUng3IEHQYYBFYQ_AUoAHoECAEQAA) Accessed May 11, 2020.*
www.CarlyleAvenue.com cited to provide overall dimensions of Zodax CH-1426 (https://carlyleavenue.com/products/modern-morocco-glass-perfume-bottles?variant=348957387) Accessed May 11, 2020.*
English lanugage machine translation of FR-2993879-A1 accessed on Patents.google.com.*
Extended European Search Report dated Oct. 11, 2019.

* cited by examiner

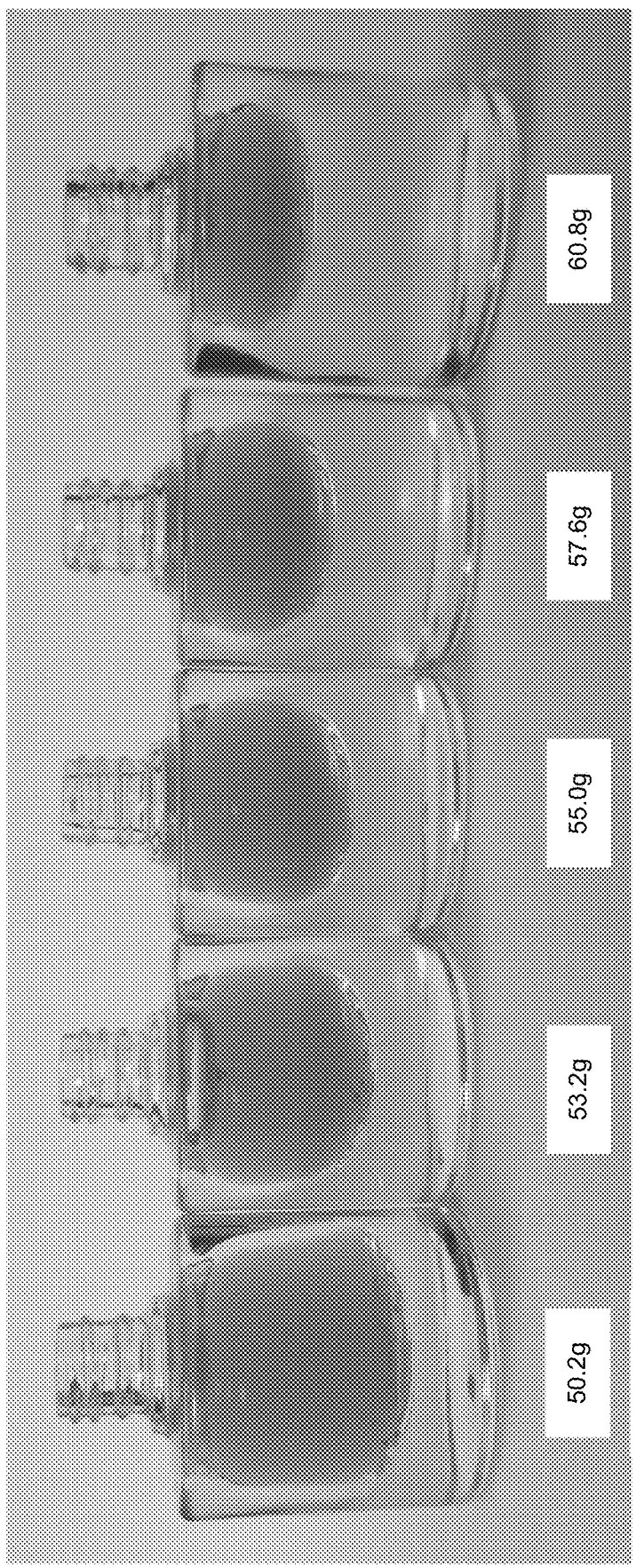

METHOD FOR MANUFACTURING GLASS CONTAINER

TECHNICAL FIELD

The present invention relates to a method for manufacturing a glass container with which a glass container having a distinctively shaped inner space and excellent aesthetic appearance can be manufactured in good yield.

BACKGROUND ART

Conventionally, glass containers are widely used as containers for accommodating cosmetics, fountain pen inks, and so on.

This is because it is possible with a glass container to easily form an appearance shape having excellent aesthetic appearance, provide a moderate weight feeling and a good texture, and foster sophistication not found in plastic containers.

A blow-and-blow method, a press-and-blow method, and a one-press method are known as manufacturing methods for industrially manufacturing such glass containers in quantity (see, for example, Patent Documents 1 to 3).

Patent Document 1 discloses a glass bottle forming apparatus for forming a glass bottle by the blow-and-blow method as illustrated in FIG. 28A. As illustrated in FIG. 28B, the glass bottle forming apparatus is provided with a blank mold 520 accommodating a gob, a baffle provided on the blank mold 520, compressed gas supply means for supplying compressed gas through the baffle, a mouth mold 512 provided in the lower portion the blank mold 520 and forming a mouth portion 518 of a parison P, and a plunger 514 inserted into the mouth mold 512 and forming the mouth portion 518 of the parison P when the gob falling into the blank mold 520 enters the mouth mold 512. The plunger 514 has a gas escape hole 570 in a top portion 560 and the gas in the blank mold 520 escapes to the outside through the gas escape hole 570.

According to the blow-and-blow method, a mass of molten glass called a gob G is introduced first into a blank mold 501 through a funnel 603 as illustrated in the step (1) of FIG. 28A.

Then, as illustrated in the step (2) of FIG. 28A, a plunger 502 is allowed to protrude into the blank mold 501, a baffle 601 is put on the funnel 603, settle blow is performed through the supply hole of the baffle 601, and the gob G is compressed from above. As a result, a mouth portion 503 of a parison 505 is formed between a mouth mold 509 and a tip portion 502a of the plunger 502.

Then, as illustrated in the step (3) of FIG. 28A, the plunger 502 is lowered and air is blown into the gob G of the blank mold 501 through the gap between the plunger 502 and a guide ring 508. As a result, the parison 505 as a semi-finished product is formed.

Then, the parison 505 is transferred to a finish mold 506 by a reversing device 600 being used as illustrated in step (4) of FIG. 28A. Then, as illustrated in the steps (5) to (6) of FIG. 28A, air is blown into the parison 505 inside the finish mold 506 and a glass bottle 507 of the final shape is formed. Then, the glass bottle 507 is taken out from the finish mold 506 as illustrated in the step (7) of FIG. 28A. The above is an outline of the blow-and-blow method.

Patent Document 2 discloses a parison forming portion of a glass bottle forming apparatus using the press-and-blow method. As illustrated in FIGS. 29A and 29B, this structure is provided with a blank mold 701, a mouth mold 702, a guide ring 703, and a plunger 704. After a gob is introduced into the blank mold 701, the plunger 704 is raised to the inside of the blank mold 701 through the guide ring 703 and the mouth mold 702, and then the parison P is formed. In this structure, the depth from the lower end of a ventilation hole 705 formed in the guide ring 703 to the upper surface of a flange-shaped guide portion 706 formed in the lower portion of the plunger 704 is at least 3 mm when the plunger 704 is raised to the highest position.

The press-and-blow method is the same as the blow-and-blow method that is illustrated in FIG. 28A except that a parison is formed by a plunger instead of air blowing.

Patent Document 3 discloses a one-press bottle manufacturing method including a pressing step and a cooling step. In the pressing step, a plunger is inserted into a finish mold filled with molten glass called a gob and a glass container of the final shape is formed. In the cooling step, the glass container of the final shape is moved to a cooling mold, and the outer peripheral surface and the inner peripheral surface of the glass container of the final shape are forcibly cooled with cooling air blown into the cooling mold and cooling air blown into the glass container of the final shape, respectively.

According to the one-press bottle manufacturing method that is disclosed in Patent Document 3, the inner peripheral surface and the outer peripheral surface of a glass container 810 of the final shape are forcibly cooled respectively with cooling air 812 blown into the glass container 810 of the final shape and cooling air 814 blown into a cooling mold 800 as illustrated in FIG. 30.

In the one-press method, the parison in the above-described press-and-blow method is used as a glass container of the final shape and the air blowing in FIG. 30 is to cool the glass container 810 of the final shape. The one-press method entails no air pressure-based glass shape change.

CITATION LIST

Patent Document

Patent Document 1: JP 9-59031 A (including claims)
Patent Document 2: JP 2003-119036 A (including claims)
Patent Document 3: JP 2000-211930 A (including claims)

SUMMARY OF THE INVENTION

Problem to be Solved by the Invention

By the blow-and-blow method described in Patent Document 1 and the press-and-blow method described in Patent Document 2, air is blown into a parison after the parison formed in the blank mold is transferred to the finish mold and the final shape is obtained by the parison being inflated until the parison comes into contact with the inner peripheral surface of the finish mold.

Accordingly, the shape of the inner space of the glass container is basically limited to a shape following the inner peripheral surface of the finish mold, and then a problem arises as it is impossible to form an inner space that has a distinctive shape such as the shape of a large bubble.

In addition, since the final outer shape is formed by parison inflation and contact with the inner peripheral surface of the finish mold, a problem arises in the form of a difficulty of stable formation in a case where the outer shape is three-dimensionally complex.

By the one-press method described in Patent Document 3, the gob introduced into the finish mold is pressed by the plunger, and thus a glass container of the final shape can be obtained with the final inner space and the final outer shape formed from the beginning.

Accordingly, a desired inner space can be formed through a change in plunger shape. In addition, formation can be stably performed by the outer side of the gob being directly pressed to the inner peripheral surface of the finish mold by plunger pressing even in the case of a three-dimensionally complex outer shape.

Still, in the one-press method, the plunger needs to be removed from the glass container of the final shape as it is after the glass container of the final shape is formed by plunger insertion with respect to the gob.

Accordingly, the plunger should basically have a columnar three-dimensional shape, and the shape of the inner space that can be formed is also basically limited to a columnar shape, which is problematic in that it is impossible to form an inner space that has a distinctive shape such as the shape of a large bubble.

In this regard, the inventors of the invention made intensive investigations in view of the above-mentioned problems and found that an inner space that has a distinctive shape such as the shape of a large bubble can be stably formed inside a gob by forming a recess on the surface of the gob and blowing air at a time into the gob with the recess as a starting point. The invention has been accomplished on the basis of the specific findings.

In other words, an object of the invention is to provide a method for manufacturing a glass container with which a glass container having a distinctively shaped inner space and excellent aesthetic appearance can be manufactured in good yield.

Means for Solving Problem

According to the method for manufacturing a glass container of the invention, the above-mentioned problems can be solved by a method for manufacturing a glass container including steps (A) to (E) being provided.

(A) A step of introducing a gob into a mold through a funnel after fitting the funnel to the mold.

(B) A step of blowing air into the mold through the funnel, bringing a plunger disposed on a side opposite the side to which the funnel is fitted in contact with the gob, separating the plunger from the gob, and forming a recess on the surface of the gob.

(C) A step of removing the funnel from the mold and fitting a baffle to the mold.

(D) A step of blowing air from the plunger, and forming an inner space inside the gob with the recess as a starting point while simultaneously forming an outer shape by pressing the outer side of the gob to a molding surface of the mold to obtain a glass container of the final shape.

(E) A step of transferring the glass container of the final shape to a cooling mold and cooling the same.

By the method for manufacturing a glass container according to the invention, a recess is formed on the surface of a gob and air is blown at a time into the gob with the recess as a starting point. Accordingly, an inner space that has a distinctive shape such as the shape of a large bubble can be stably formed inside the gob.

Accordingly, a glass container having a distinctively shaped inner space and excellent aesthetic appearance can be manufactured in good yield.

In addition, formation can be stably performed by the outer side of the gob being directly pressed to the molding surface of the mold by the air from the plunger even in the case of a three-dimensionally complex outer shape.

According to the manufacturing method of the invention, it has been confirmed that the inner space and the outer shape of the glass container of the final shape preceding step (E) and the inner space and the outer shape of the final glass container following step (E) are substantially identical to each other although an extremely slight difference may occur depending on manufacturing conditions.

In carrying out the method for manufacturing a glass container according to the invention, it is preferable that the inner space formed inside the gob in step (D) includes a passage portion formed in communication with the outside and an accommodating portion formed continuously from the innermost end portion of the passage portion.

By the method being carried out in this manner, the inner space that has a desired distinctive shape can be formed more stably in conjunction with the pressure diffusion of air blown at a time inside the gob.

In carrying out the method for manufacturing a glass container according to the invention, it is preferable that the passage portion has a cylindrical shape and the accommodating portion has a spherical shape.

By the method being carried out in this manner, the inner space that has a predetermined shape can be formed even more stably in conjunction with the pressure diffusion of air blown at a time inside the gob.

In carrying out the method for manufacturing a glass container according to the invention, it is preferable that the following relational expression (1) is satisfied in a case where the passage portion has a cylinder diameter C (mm) and the accommodating portion has a sphere diameter B (mm).

$$7 \leq B - C \leq 15 \tag{1}$$

By the method being carried out in this manner, the inner space that has a predetermined shape can be formed far more stably in conjunction with the pressure diffusion of air blown at a time inside the gob.

In carrying out the method for manufacturing a glass container according to the invention, it is preferable that the cylinder diameter C is a value within the range of 4 to 24 mm and the sphere diameter B is a value within the range of 11 to 39 mm.

By the method being carried out in this manner, the inner space that has a predetermined shape can be formed still more stably in conjunction with the pressure diffusion of air blown at a time inside the gob.

In carrying out the method for manufacturing a glass container according to the invention, it is preferable that the ratio of the volume of the inner space is a value within the range of 15 to 30 vol % in a case where the volume of the glass part of the glass container of the final shape is 100 vol % in step (D).

By the method being carried out in this manner, the pressure diffusion condition of air blown at a time inside the gob reaches a more preferable range, and thus a desired distinctive inner space can be formed still more stably.

In carrying out the method for manufacturing a glass container according to the invention, it is preferable that a glass container of the final shape is formed further having a second inner space at a position facing a first inner space in a case where the inner space is defined as the first inner space in step (D) by a baffle having a projecting molding surface part being used as the baffle in step (C).

By the method being carried out in this manner, the first inner space that has a distinctive shape can be formed and the second inner space having a one-press shape can be accurately formed separately yet at the same time. As a result, a predetermined double-mouth glass container can be obtained.

In carrying out the method for manufacturing a glass container according to the invention, it is preferable that the recess formed on the surface of the gob in step (B) has a maximum diameter of a value within the range of 4 to 24 mm and a depth of a value within the range of 3 to 10 mm.

By the method being carried out in this manner, the traveling direction and the pressure diffusion condition of air blown at a time inside the gob can be more stably controlled.

In carrying out the method for manufacturing a glass container according to the invention, it is preferable that the air blown from the plunger in step (D) has a pressure of a value within the range of 1.5 to 3 kPa and the duration of the air blowing is a value within the range of 1.04 to 1.25 seconds.

By the method being carried out in this manner, the pressure diffusion condition of air blown at a time inside the gob reaches an even more preferable range, and thus a desired distinctive inner space can be formed even more stably.

BRIEF DESCRIPTION OF DRAWINGS

FIG. 25A to 25E are diagrams illustrating a picture in which glass containers manufactured in Examples 1 to 5 are arranged;

BEST MODE(S) FOR CARRYING OUT THE INVENTION

An embodiment of the invention is a method for manufacturing a glass container including steps (A) to (E).

(A) A step of introducing a gob into a mold through a funnel after fitting the funnel to the mold.

(B) A step of blowing air into the mold through the funnel, bringing a plunger disposed on a side opposite the side to which the funnel is fitted in contact with the gob, separating the plunger from the gob, and forming a recess on the surface of the gob.

(C) A step of removing the funnel from the mold and fitting a baffle to the mold.

(D) A step of blowing air from the plunger, and forming an inner space inside the gob with the recess as a starting point while simultaneously forming an outer shape by pressing the outer side of the gob to a molding surface of the mold to obtain a glass container of the final shape.

(E) A step of transferring the glass container of the final shape to a cooling mold and cooling the same.

Hereinafter, the embodiment of the invention will be described in detail with reference to accompanying drawings.

1. Each Step

The method for manufacturing a glass container according to the invention includes predetermined steps (A) to (E).

Accordingly, each step will be described first with reference to FIGS. 1 to 7, and then an apparatus for manufacturing a glass container will be described in detail along with a mold, a plunger, a funnel, a baffle, a cooling mold, and so on that constitute the glass container manufacturing apparatus.

(1) Step (A)

Figure 1:
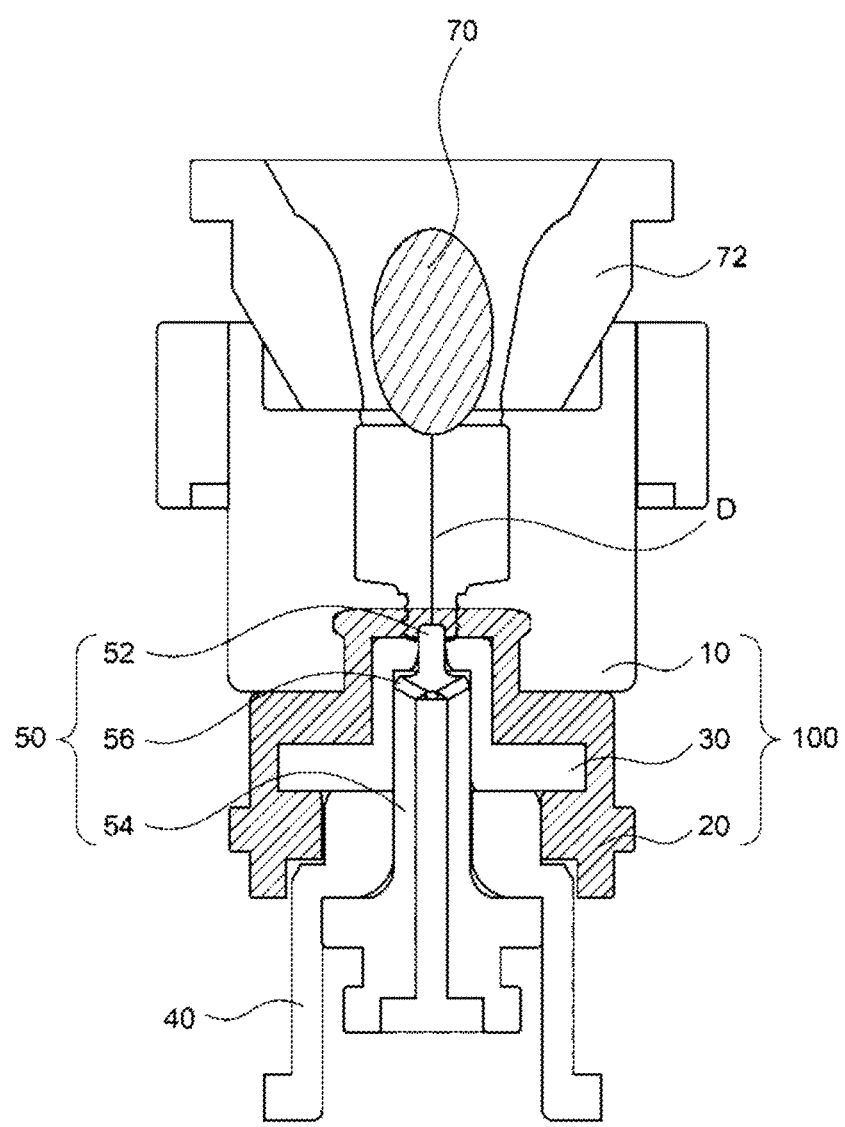
FIG. 1 is a diagram provided for describing step (A) of a method for manufacturing a glass container according to the invention.

As illustrated in FIG. 1, step (A) is a step of introducing a gob 70 into a mold 100 through a funnel 72 after fitting the funnel 72 to the mold 100.

Although the composition of the gob 70 is not particularly limited, it is preferable to use the composition of ordinary soda lime glass.

Although the weight of the gob 70 depends on the glass container to be manufactured, a value within the range of 20 to 150 g is ordinarily preferable as the weight of the gob 70.

A value within the range of 900 to 1,000° C. is ordinarily preferable as the temperature of the gob 70.

FIG. 1 is a sectional view in which the whole including the mold 100, a plunger 50, and so on is cut along a plane orthogonal to a two-part section for halving and opening the mold 100 and the cut surface is viewed from the front. The line D that is illustrated in FIG. 1 is a dividing line used when the mold 100 is halved and opened (the same applies to FIGS. 2 to 4).

(2) Step (B)

Figure 2:
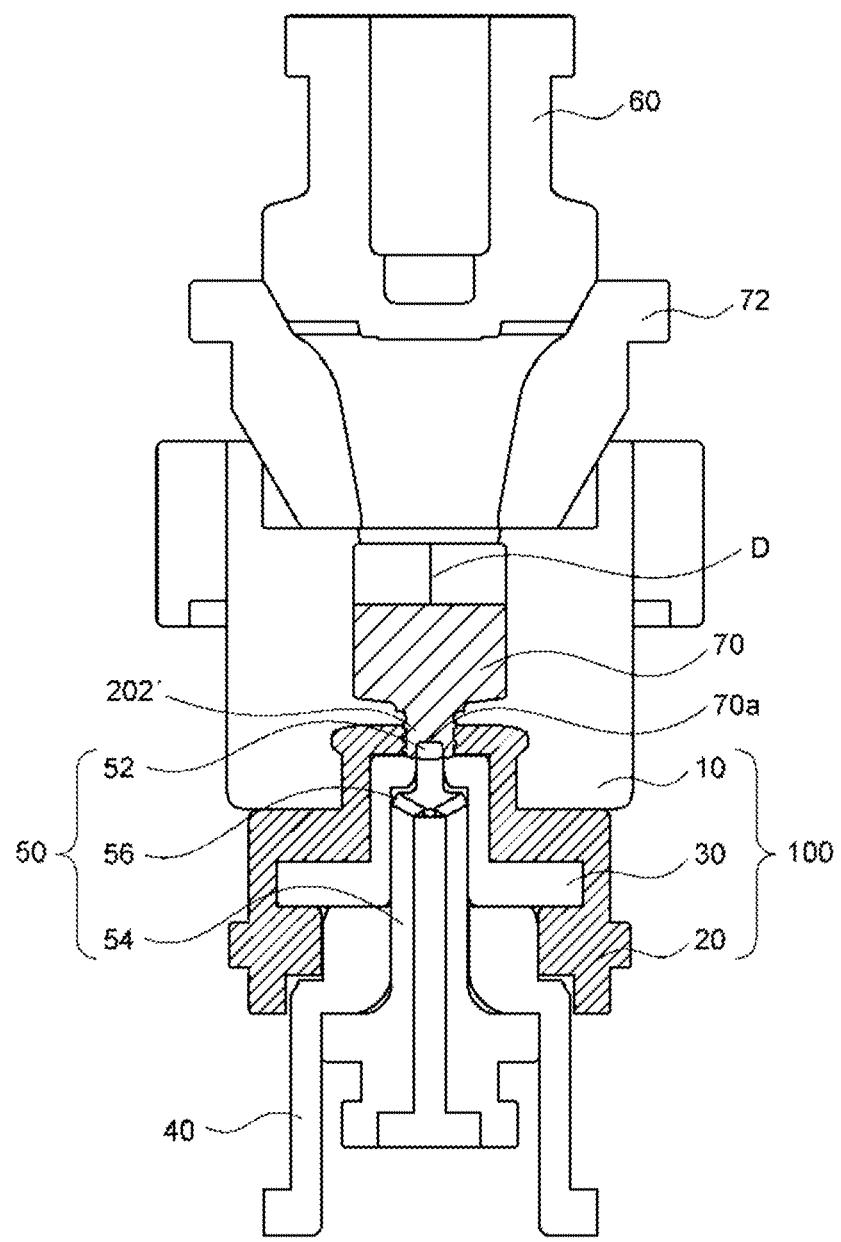
FIG. 2 is a diagram provided for describing step (B) of the method for manufacturing a glass container according to the invention.

As illustrated in FIG. 2, step (B) is a step of blowing air into the mold 100 through the funnel 72, bringing the plunger 50 disposed on a side opposite the side to which the funnel 72 is fitted in contact with the gob 70, separating the plunger 50 from the gob 70, and forming a recess 70a on the surface of the gob 70.

In step (B), the plunger 50 is raised in advance first up to a height at which a tip portion 52 of the plunger 50 reaches a place in the mold 100 where a mouth portion 202' of a glass container 200' of the final shape is formed. In this state, air is blown into the mold 100 through the funnel 72, the gob 70 is pushed downwards, the lower surface of the gob 70 is brought in contact with the tip portion 52 of the plunger 50, and the recess 70a is formed as a result.

At this time, the outer shape of the mouth portion 202' of the glass container 200' of the final shape is also formed.

In the following description, the air blowing described above will be referred to as "settle blow" in some cases.

From the viewpoint of the machine operation efficiency of an IS machine to be described later, it is preferable that the settle blow is performed through a baffle 60 and the funnel 72 with the baffle 60 fitted to the opening portion of the funnel 72 as illustrated in FIG. 2.

From the viewpoint of reliably removing the residual air between the gob 70 and the mold 100 and clearly forming the outer shapes of the recess 70a and the mouth portion 202', it is preferable that the air pressure of the settle blow is a value within the range of 1.5 to 3 kPa and it is preferable that the duration of the settle blow is a value within the range of 0.1 to 0.31 seconds.

After the settle blow is completed, the plunger 50 is moved downwards, the tip portion 52 of the plunger 50 is removed from the recess 70a, and the recess 70a is formed on the surface of the gob 70.

Preferably, the maximum diameter of the recess 70a formed on the surface of the gob 70 is a value within the range of 4 to 24 mm.

This is because it may be difficult to blow air into the gob 70 with the recess 70a as a starting point in step (D) and it may be difficult to stably control the traveling direction and the pressure diffusion condition of air blown at a time inside the gob 70 if the maximum diameter of the recess 70a is a value of below 4 mm and air may be excessively blown into the gob 70 with the recess 70a as a starting point in step (D) and it may be difficult to stably control the traveling direction and the pressure diffusion condition of air blown at a time inside the gob 70 if the maximum diameter of the recess 70a is a value of above 24 mm.

Accordingly, the maximum diameter of the recess 70a formed on the surface of the gob 70 is more preferably a value within the range of 5 to 15 mm and even more preferably a value within the range of 5.5 to 10 mm.

From the viewpoint of uniformly controlling the pressure that is applied to the recess 70a during counter blow, it is preferable that the recess 70a has a circular planar shape.

Preferably, the depth of the recess 70a formed on the surface of the gob 70 is a value within the range of 3 to 10 mm.

This is because it may be difficult to blow air into the gob 70 with the recess 70a as a starting point in step (D) and it may be difficult to stably control the traveling direction and the pressure diffusion condition of air blown at a time inside the gob 70 if the depth of the recess 70a is a value of below 3 mm and air may be excessively blown into the gob 70 with the recess 70a as a starting point in step (D) and it may be difficult to stably control the traveling direction and the pressure diffusion condition of air blown at a time inside the gob 70 if the depth of the recess 70a is a value of above 10 mm.

Accordingly, the depth of the recess 70a formed on the surface of the gob 70 is more preferably a value within the range of 3.2 to 7 mm and even more preferably a value within the range of 3.5 to 5 mm.

(3) Step (C)

Figure 3:
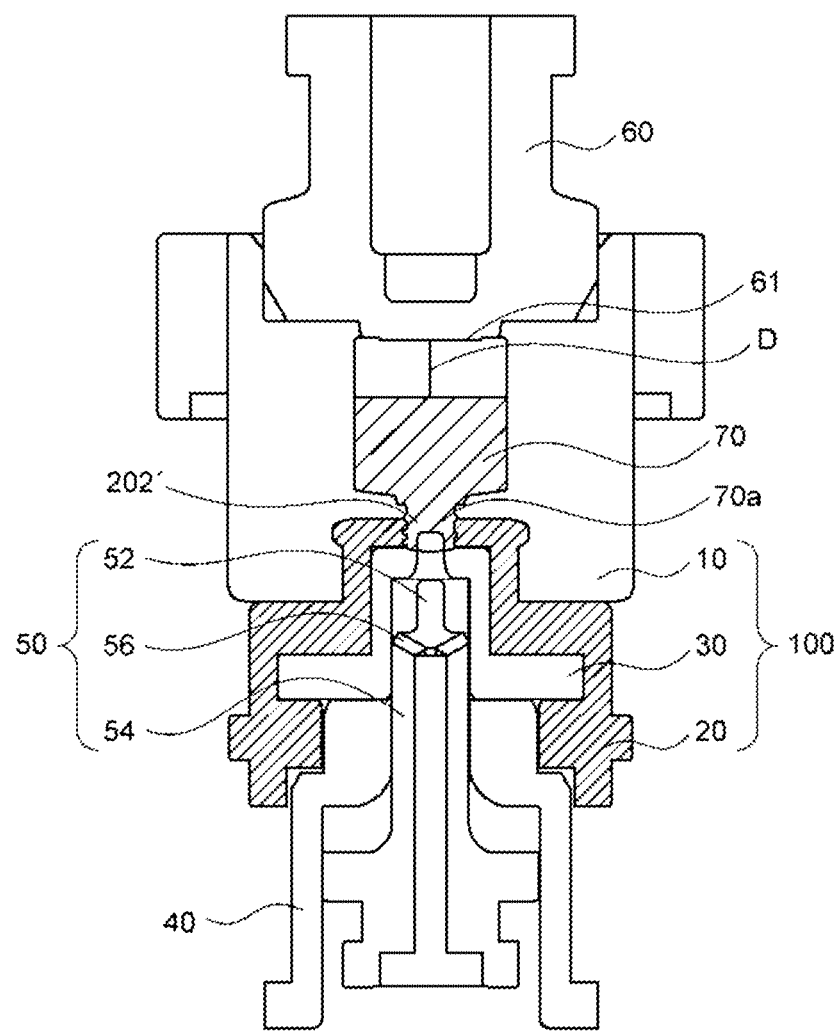
FIG. 3 is a diagram provided for describing step (C) of the method for manufacturing a glass container according to the invention.

As illustrated in FIG. 3, step (C) is a step of removing the funnel 72 from the mold 100 and fitting the baffle 60 to the mold 100.

A projection 61 on the bottom surface of the baffle 60 forms a bottom portion 204' of the glass container 200' of the final shape.

(4) Step (D)

Figure 4:
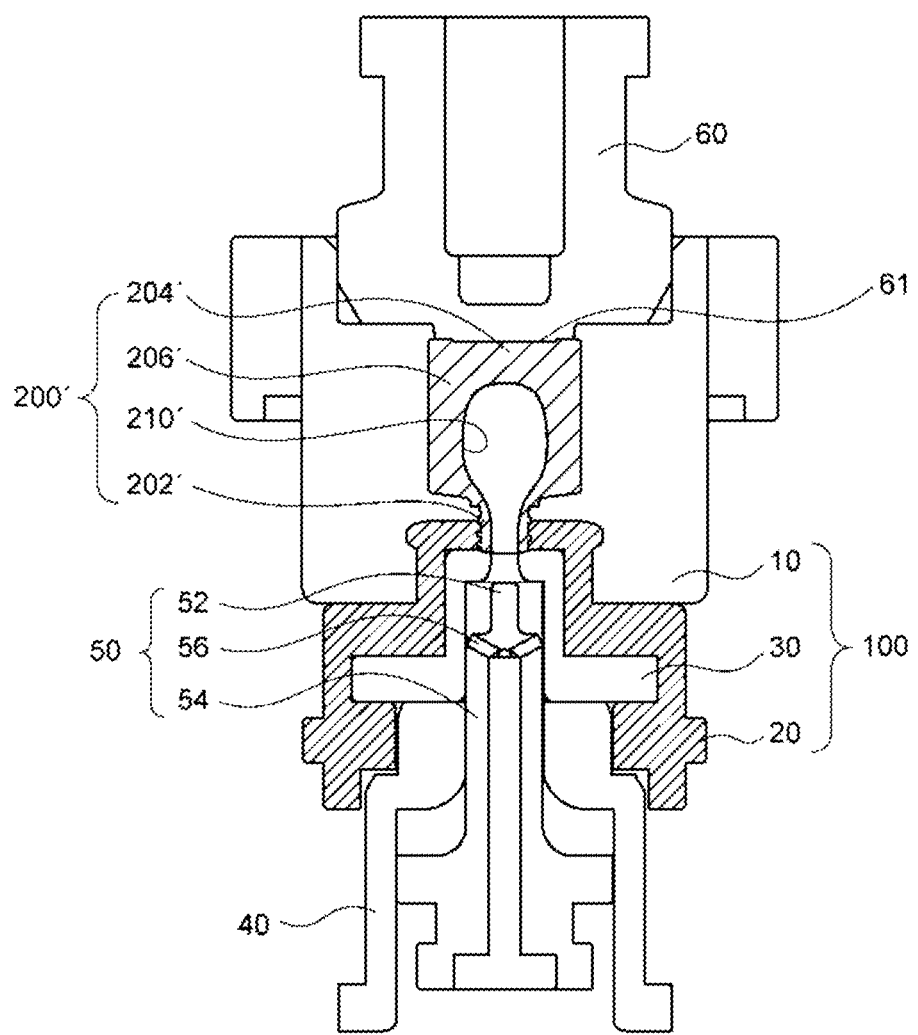
FIG. 4 is a diagram provided for describing step (D) of the method for manufacturing a glass container according to the invention.

As illustrated in FIG. 4, step (D) is a step of blowing air from the plunger 50, and forming an inner space 210' inside the gob 70 with the recess 70a as a starting point while simultaneously forming an outer shape by pressing the outer side of the gob 70 to a molding surface of the mold 100 to obtain the glass container 200' of the final shape.

In step (D), the gob 70 is inflated while the inner space 210' is formed by air being blown into the gob 70 and the outer side of the gob 70 is pressed to the molding surface of the mold 100. Then, the outer shapes of a body portion 206' and the bottom portion 204' are formed and the glass container 200' of the final shape is formed at once.

More specifically, at this time, the outer shape of the bottom portion 204' is formed by the projection 61 of the baffle 60.

In the following description, the air blowing described above will be referred to as "counter blow" in some cases.

Preferably, the counter blow is performed by air blown from a blowing hole 56 provided at the upper end of a pedestal portion 54 of the tip portion 52 through the inside of the plunger 50 as illustrated in FIG. 4.

This is because air blown from the blowing hole 56 to be shielded by the pedestal portion 54, lose the downward escape path thereof, and be efficiently blown into the gob 70.

Figure 5A:
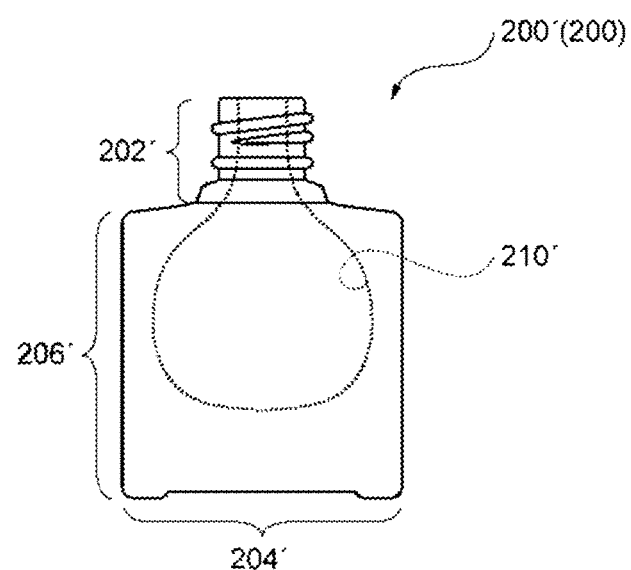
FIGS. 5A and 5B are diagrams provided for describing a glass container of the final shape obtained in step (D)
Figure 5B:
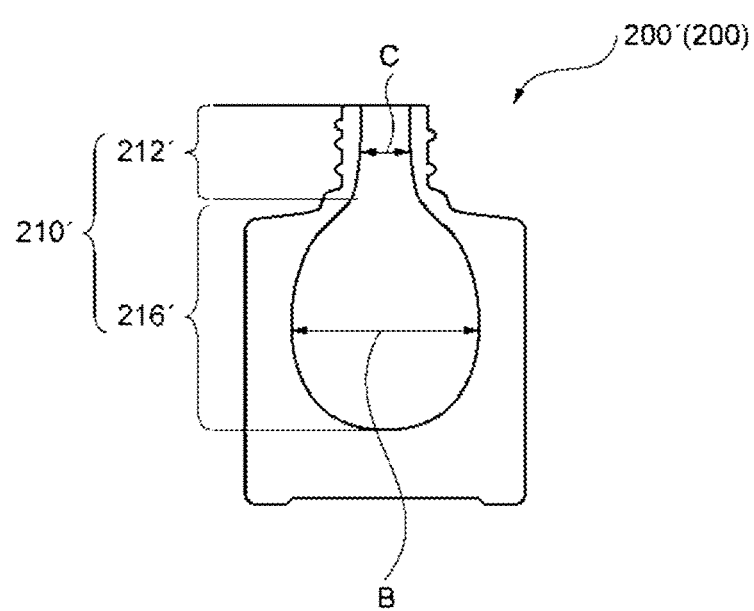

Preferably, the inner space 210' formed inside the gob 70 includes a passage portion 212' formed in communication with the outside and an accommodating portion 216' formed continuously from the innermost portion of the passage portion 212' as illustrated in FIGS. 5A and 5B.

This is because the inner space 210' that has a desired distinctive shape can be formed more stably in conjunction with the pressure diffusion of air blown at a time inside the gob 70 by the inner space 210' including the passage portion 212' and the accommodating portion 216'.

More specifically, as illustrated in FIGS. 5A and 5B, the glass container 200' of the final shape ordinarily has, as the outer shape thereof, the body portion 206' relatively large in sectional diameter and sectional volume and the mouth portion 202' positioned on the body portion 206', having an opening portion at the tip thereof, and relatively small in sectional diameter and sectional volume.

Accordingly, air blown into the gob 70 is likely to go straight in the direction of the large-volume body portion 206' as pressure hardly diffuses to the surroundings in the mouth portion 202'. Inevitably as a result, the linear passage portion 212' small in diameter is likely to be formed inside the mouth portion 202' and the large-diameter accommodating portion 216' wider than the passage portion 212' is likely to be formed inside the body portion 206' while pushing and spreading the gob 70 to the surroundings.

FIG. 5A is a front view of the glass container 200' of the final shape, and FIG. 5B is a sectional view in which the glass container 200' of the final shape is vertically cut.

Preferably, the passage portion 212' has a cylindrical shape and the accommodating portion 216' has a spherical shape as illustrated in FIGS. 5A and 5B.

This is because the inner space 210' that has a predetermined shape can be formed more stably in conjunction with the pressure diffusion of air blown at a time inside the gob 70 by the passage portion 212' having a cylindrical shape and the accommodating portion 216' having a spherical shape.

In other words, once air is blown into the gob 70 at a time, the blown air linearly rises while forming the passage portion 212' inside the mouth portion 202' as described above, and the air attempts to spread while undergoing pressure diffusion in the body portion 206', during which the air attempts to diffuse the pressure as uniformly as possible.

Accordingly, although the outer shape of the glass container 200' of the final shape does have some effect, basically the shapes of the passage portion 212' and the accommodating portion 216' tend to become cylindrical and spherical, respectively.

The "cylindrical shape" of the passage portion 212' and the "spherical shape" of the accommodating portion 216' are not limited to the "cylindrical shape" and the "spherical shape" in the strict sense, and the shapes include levels that can be generally regarded as a "cylindrical shape" and a "substantially spherical shape" as a result of naked-eye observation by ordinary people.

In addition, an "ellipsoidal shape" is included in the "spherical shape".

The shape and the size of the inner space 210' in FIG. 5A differ from the shape and the size of the inner space 210' in FIG. 5B, and this is attributed to the lens effect of glass.

In other words, the accommodating portion 216' of the inner space 210' has a planar shape that appears circular in the front view illustrated in FIG. 5A owing to the lens effect of glass whereas the accommodating portion 216' of the inner space 210' has an elliptical planar shape in the sectional view illustrated in FIG. 5B.

Preferably, the following relational expression (1) is satisfied in a case where the passage portion 212' has a cylinder diameter C (mm) and the accommodating portion 216' has a sphere diameter B (mm) as illustrated in FIG. 5B.

$$7 \leq B-C \leq 15 \tag{1}$$

This is because air blown into the gob 70 may be insufficiently pressure-diffused and may not expand, even if the air reaches the innermost portion of the passage portion 212', and it may be difficult as a result to form the accommodating portion 216' that has a sufficient size if B−C is a value of below 7 and the shape of the accommodating portion 216' may be distorted or the formation position thereof may become unstable with air blown into the gob 70 undergoing excessively rapid pressure diffusion and expansion in the innermost portion of the passage portion 212' if B−C is a value of above 15.

Accordingly, it is more preferable that the following relational expression (1') is satisfied and it is even more preferable that the following relational expression (1") is satisfied in a case where the passage portion 212' has the cylinder diameter C (mm) and the accommodating portion 216' has the sphere diameter B (mm).

$$8 \leq B-C \leq 14 \tag{1'}$$

$$9 \leq B-C \leq 13 \tag{1"}$$

In a case where the accommodating portion 216' has an ellipsoidal shape as illustrated in FIG. 5(b), the sphere diameter B means the length of the minor axis thereof.

From the viewpoint of satisfying the above-mentioned relational expression (1) while taking into account the sizes of ordinary glass containers, it is preferable that the cylinder diameter C is a value within the range of 4 to 24 mm, it is more preferable that the cylinder diameter C is a value within the range of 5 to 15 mm, and it is even more preferable that the cylinder diameter C is a value within the range of 6 to 10 mm.

From the same viewpoint, it is preferable that the sphere diameter B is a value within the range of 11 to 39 mm, it is more preferable that the sphere diameter B is a value within the range of 14 to 22 mm, and it is even more preferable that the sphere diameter B is a value within the range of 16 to 20 mm.

Figure 6A:
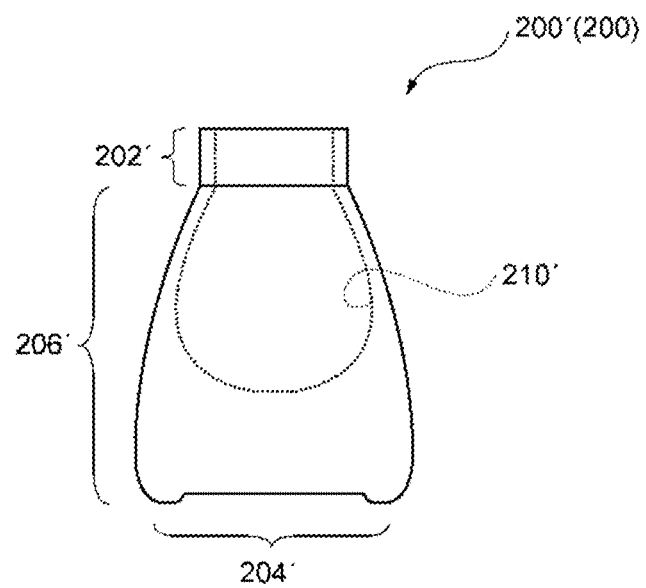
FIGS. 6A and 6B are additional diagrams provided for describing the glass container of the final shape obtained in step (D)
Figure 6B:
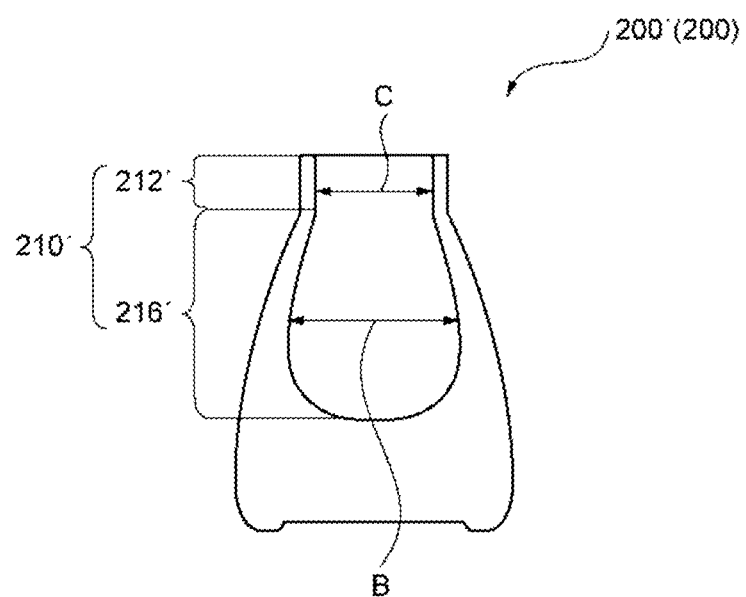

Although the above description focuses on the inner space 210' with a predetermined shape illustrated in FIGS. 5A and 5B, it is one of preferred examples and may have various aspects, examples of which include the inner space 210' of eggplant type that is illustrated in FIGS. 6A and 6B.

FIG. 6A is a front view of the glass container 200' of the final shape, and FIG. 6B is a sectional view in which the glass container 200' of the final shape is vertically cut.

Preferably, the ratio of the volume of the inner space 210' is a value within the range of 15 to 30 vol % in a case where the volume of the glass part of the glass container 200' of the final shape is 100 vol %.

This is because the pressure diffusion condition of air blown at a time inside the gob 70 may become excessively gentle and it may be difficult as a result to stably form the desired distinctive inner space 210' if the ratio is a value of below 15 vol % and the pressure diffusion condition of air blown at a time inside the gob 70 may become excessively severe and it may be difficult as a result to stably form the desired distinctive inner space 210' if the ratio is a value of above 30 vol %.

Accordingly, it is more preferable that the ratio of the volume of the inner space 210' is a value within the range of 19 to 27 vol % and it is even more preferable that the ratio of the volume of the inner space 210' is a value within the range of 21 to 25 vol % in a case where the volume of the glass part of the glass container 200' of the final shape is 100 vol %.

In addition, it is preferable that the pressure of the air that is blown from the plunger 50 is a value within the range of 1.5 to 3 kPa.

This is because the pressure diffusion condition of air blown at a time inside the gob 70 may become excessively gentle and it may be difficult as a result to stably form the desired distinctive inner space 210' if the air pressure is a value of below 1.5 kPa and the pressure diffusion condition of air blown at a time inside the gob 70 may become excessively severe and it may be difficult as a result to stably form the desired distinctive inner space 210' if the air pressure is a value of above 3 kPa.

Accordingly, it is more preferable that the pressure of the air that is blown from the plunger 50 is a value within the range of 1.7 to 2.8 kPa and it is even more preferable that the pressure of the air that is blown from the plunger 50 is a value within the range of 1.9 to 2.6 kPa.

In addition, it is preferable that the duration of the air blowing from the plunger 50 is a value within the range of 1.04 to 1.25 seconds.

This is because it may be difficult to form the inner space 210' with a sufficient capacity if the duration of the air blowing is a value of below 1.04 seconds and the inner space 210' with a uniform initial shape may become prone to deformation by air blown afterwards if the duration of the air blowing is a value of above 1.25 seconds.

Accordingly, it is more preferable that the duration of the air blowing from the plunger 50 is a value within the range of 1.07 to 1.23 seconds and it is even more preferable that the duration of the air blowing from the plunger 50 is a value within the range of 1.1 to 1.2 seconds.

In the method for manufacturing a glass container according to the invention, a change in dimension needs to be prevented until complete cooling in step (E) by the glass container 200' of the final shape being cooled to some extent in a stage preceding step (E), which is a cooling step, after the glass container 200' of the final shape is formed in step (D).

Accordingly, it is preferable that the glass container 200' of the final shape is left as it is in the mold 100, as illustrated in FIG. 4, for 5.42 to 6.25 seconds after the formation of the glass container 200' of the final shape in step (D) and then the glass container 200' of the final shape is cooled until reaching a value within the range of 690 to 710° C.

(5) Step (E)

Figure 7A:
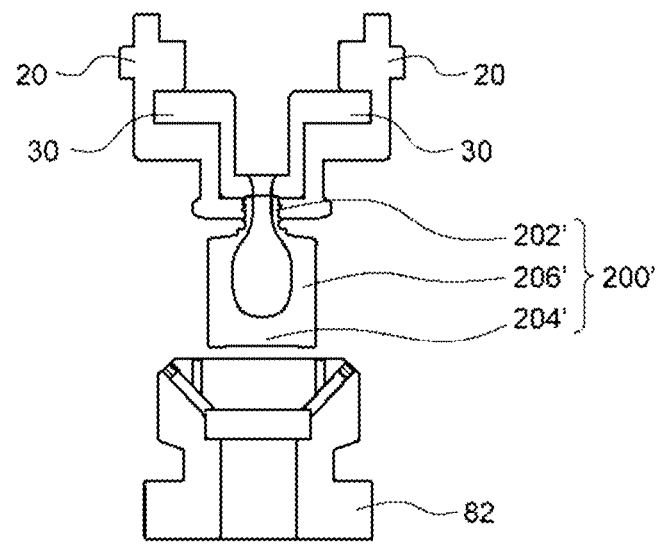
FIGS. 7A to 7C are diagrams provided for describing step (E) of the method for manufacturing a glass container according to the invention.
Figure 7B:
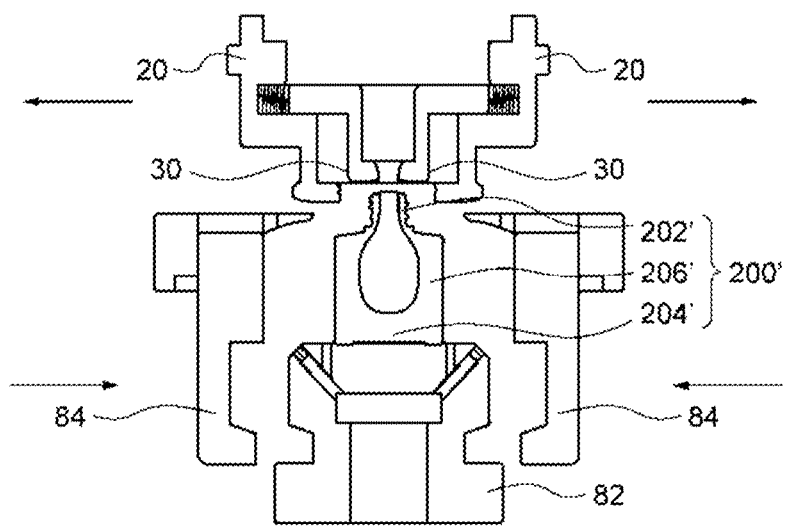
Figure 7C:
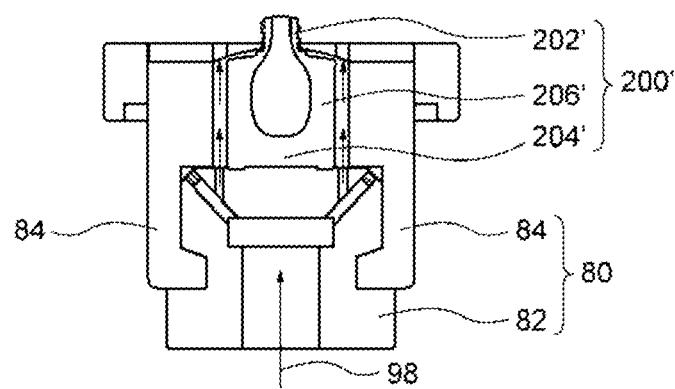

As illustrated in FIGS. 7A to 7C, step (E) is a step of transferring the glass container 200' of the final shape to a cooling mold 80 and cooling the same.

More specifically, the baffle 60 is removed, and then a mold base portion 10, which is a part of the mold 100, is halved and removed.

At this point in time, the mouth portion 202' of the glass container 200' of the final shape is clamped by a mouth mold 20, which is connected to an arm (not illustrated) as a part of the mold 100, with the bottom portion 204' on the upper side.

Next, the arm is rotated by 180° around a fulcrum, the glass container 200' of the final shape is turned upside down, and the glass container 200' of the final shape is moved directly above a bottom mold 82, which is a part of the cooling mold 80, as illustrated in FIG. 7A.

Next, the mouth mold 20 is halved and opened as illustrated in FIG. 7B. Then, the glass container 200' of the final shape falls due to its own weight and is placed on the bottom mold 82.

Next, two divided finish molds 84, which is a part of the cooling mold 80, are brought together from both sides as illustrated in FIG. 7C. Then, the glass container 200' of the final shape is accommodated in the cooling mold 80.

Next, cooling air 98 is supplied from below the bottom mold 82, and the cooling air 98 is passed upwards from below through the gaps between the outer peripheral surface of the glass container 200' of the final shape and the inner peripheral surfaces of the finish molds 84.

As a result, the glass container 200' of the final shape is cooled to a value within the range of 600 to 650° C., which is a temperature entailing no change in dimension, and becomes a final glass container 200.

FIGS. 7A to 7C are sectional views in which the whole including the mold 100, the cooling mold 80, and so on is cut along a plane orthogonal to a two-part section for halving and opening the mold 100 and the cut surface is viewed from the front.

2. Glass Container Manufacturing Apparatus

Figure 8:
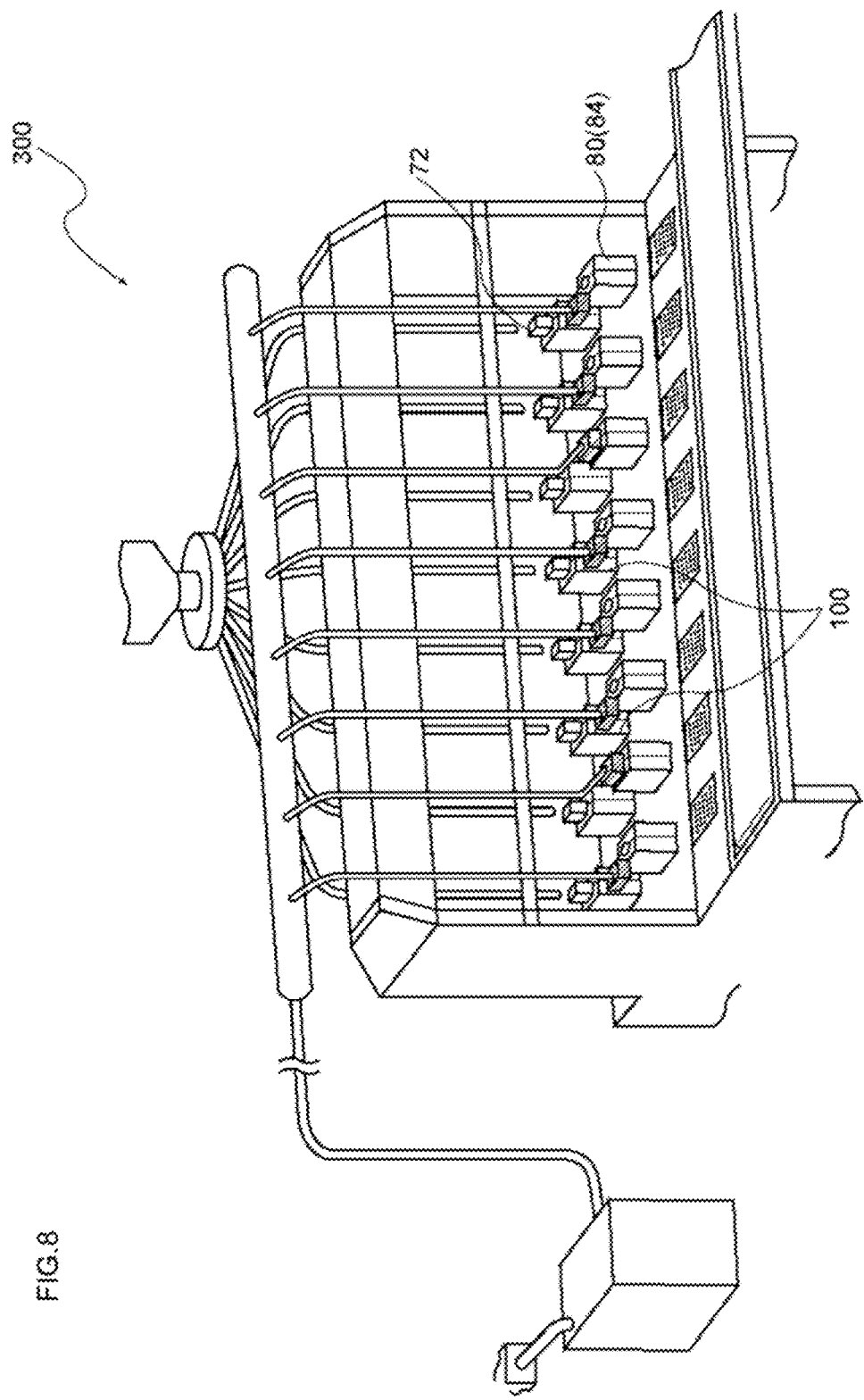
FIG. 8 is a diagram provided for describing a glass container manufacturing apparatus.

Basically, an individual section machine (IS machine) 300 as illustrated in FIG. 8 can be used as a glass container manufacturing apparatus for carrying out the method for manufacturing a glass container according to the invention.

The IS machine 300 is configured to use the predetermined mold 100 and cool a glass container of the final shape formed with the mold 100 by using cooling air sprayed along the inner peripheral surface of the finish mold 84 after transferring the glass container to the cooling mold 80.

In other words, it is possible to manufacture a predetermined glass container simply by forming a glass container of the final shape with a single blow of air and then cooling the glass container of the final shape in the cooling mold 80.

Accordingly, with the IS machine, the glass container 200 having a distinctively shaped inner space and excellent aesthetic appearance as in FIGS. 5A and 5B can be manufactured with ease and continuity.

FIG. 8 is a perspective view of the IS machine 300.

(1) Mold

Figure 9A:
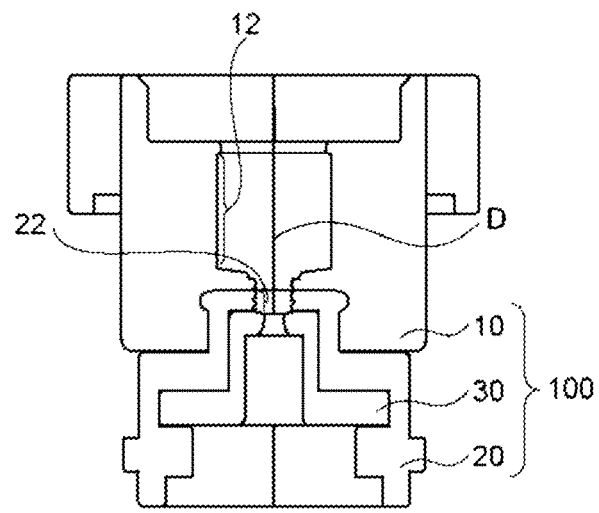
FIGS. 9A to 9C are diagrams provided for describing a mold.
Figure 9B:
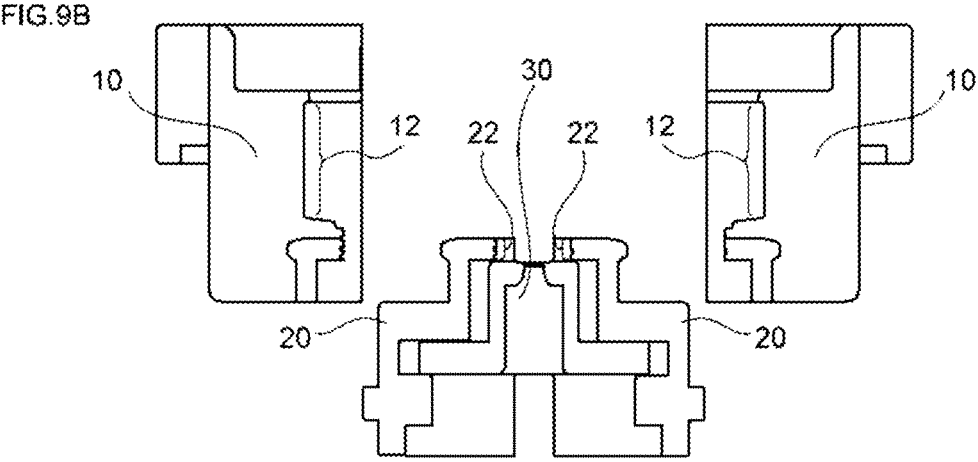
Figure 9C:
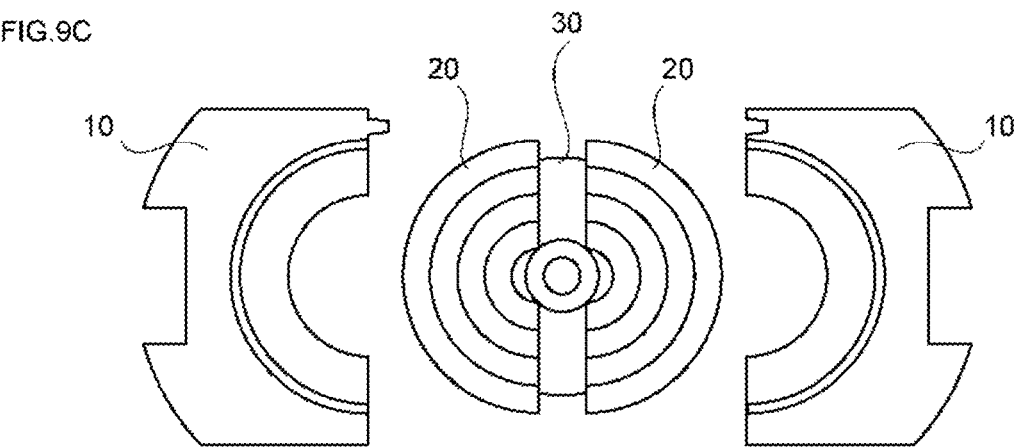

As illustrated in FIGS. 9A to 9C, it is preferable that the mold 100 according to the invention is configured to include the mold base portion 10 and the mouth mold 20, each of which is divided into two, and a guide ring 30 accommodated in the mouth mold 20 to be slidable with respect to a contact surface with respect to the mouth mold 20 during opening and closing of the mouth mold 20.

FIG. 9A is a sectional view in which the mold 100 is cut along a plane orthogonal to a two-part section for halving and opening the mold 100 and the cut surface is viewed from the front.

FIG. 9B is a sectional view illustrating a state where the mold 100 illustrated in FIG. 9A is halved and opened.

FIG. 9(c) is a plan view of the halved and opened mold 100 that is illustrated in FIG. 9B.

Each of the mold base portion 10, the mouth mold 20, and the guide ring 30 will be described in detail below.

(1)-1 Mold Base Portion

As illustrated in FIGS. 9A to 9C, the mold base portion 10 according to the invention is a mold member for forming the outer shapes of the body portion and the mouth portion of a glass container.

The mold base portion 10 has a dividing line D for halving and opening and has a body forming portion 12 that has an inner peripheral surface for forming the outer shape of the body portion of a glass container.

An opening portion for gob introduction is provided above the body forming portion 12. The opening portion is provided with a recess for funnel and baffle fitting.

The inner wall of the recess is basically vertical, and a short-tapered part with a length of approximately 2 to 5 mm is provided only at the upper part thereof.

As a result, collision and friction with the mold base portion 10 can be reduced and centering can be efficiently performed during baffle fitting.

Accordingly, the bottom portion of a glass container can be stably formed by a baffle fitted to the mold base portion 10.

An opening portion is provided below the body forming portion 12 as well so that the upper portions of the mouth mold 20 are pinched from both sides and integrated. The upper opening portion, the body forming portion 12, and the lower opening portion communicate with each other.

The size and the shape of the mold base portion 10 may be appropriately selected in accordance with the size and the shape of the glass container to be manufactured.

Figure 10A:
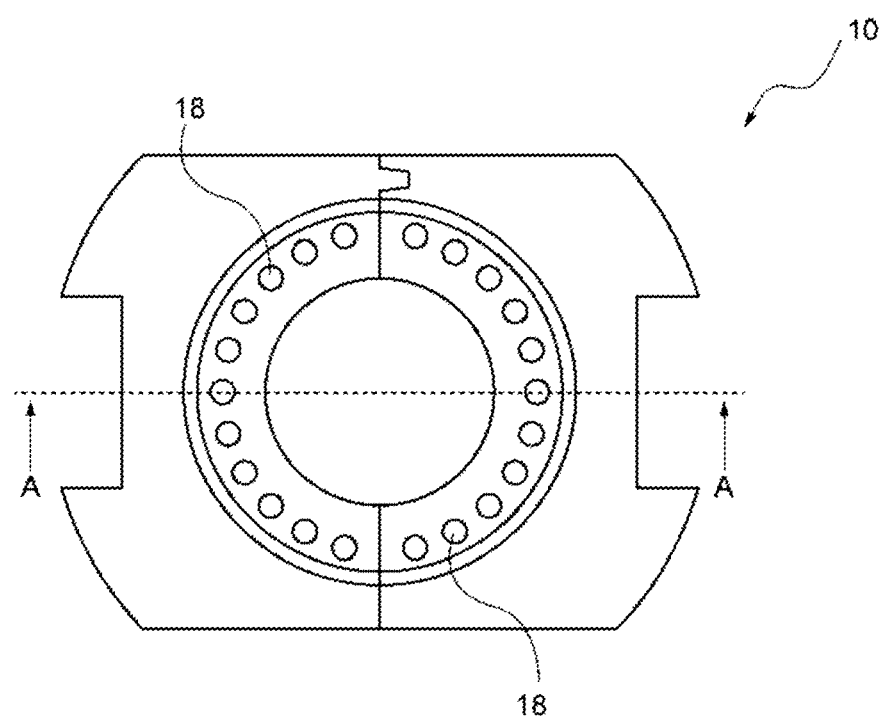
FIGS. 10A and 10B are diagrams provided for describing a mold base portion.
Figure 10B:
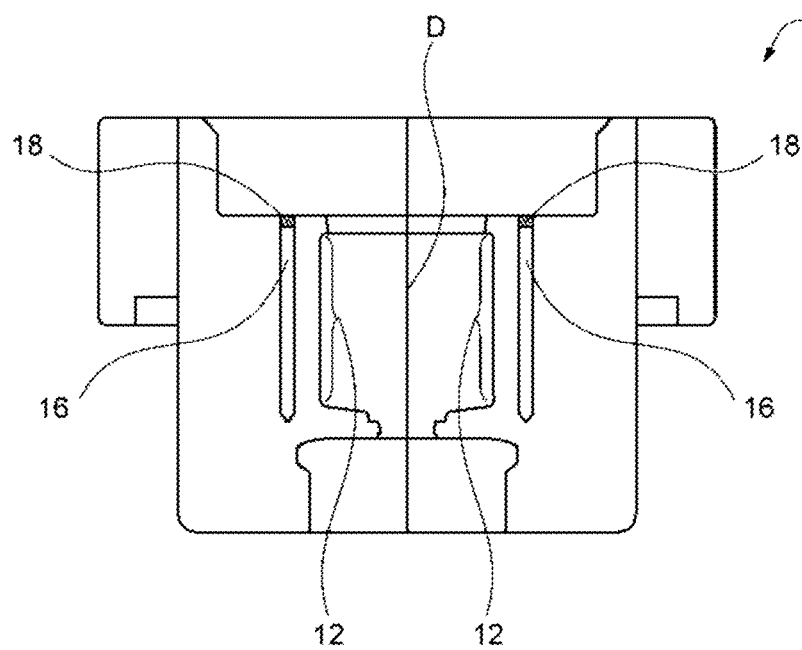

As illustrated in FIGS. 10A and 10B, it is preferable that an air sealing-based cavity portion 16 is provided such that the body forming portion 12 of the mold base portion 10 is surrounded.

This is because the disposition of the cavity portion 16 allows the body portion and the bottom portion to be formed in a more stable manner by improving the heat retention properties of the upper part of the body forming portion 12, which is particularly prone to a decline in mold temperature.

In other words, the mold temperature of the mold 100 can be kept uniform by the cavity portion 16 and, as a result, defects such as wrinkles and kinks attributable to a partial decline in temperature can be effectively suppressed.

It is presumed that the lower part of the body forming portion 12 is owing to the mold base portion 10 pinching the mouth mold 20, which is a separate member, at the lower part thereof. Still, no heat retention property improvement is necessary because of an originally low heat conduction efficiency.

The cavity portion 16 can be formed by sealing being performed with bolts 18 or the like after hole portions with a diameter of approximately 4 to 8 mm and a depth of approximately 10 to 20 mm are provided at an interval of 1.5 to 5 mm downwards from above such that the body forming portion 12 is surrounded.

FIG. 10A is a plan view of the mold base portion 10. FIG. 10B is a sectional view in which the mold base portion 10 is vertically cut along the dotted line A-A illustrated in FIG. 10A and the cut surface is viewed from the direction along the arrow.

A conventionally known material may be used as the constituent material of the mold base portion 10. Although not particularly limited, examples thereof can include iron, an iron alloy, brass, and a copper-nickel alloy.

(1)-2 Mouth Mold

As illustrated in FIGS. 9A to 9C, the mouth mold 20 according to the invention is a mold member for forming the outer shape of the mouth portion of a glass container.

The mouth mold 20 has the dividing line D for halving and opening and has a mouth forming portion 22 that has an inner peripheral surface for forming the outer shape of the mouth portion of a glass container on the inner wall of the opening portion in the upper surface. In a case where the mouth portion is configured to be screwed with a lid member, the mouth forming portion 22 is provided with a groove portion for screw thread formation.

Figure 11A:
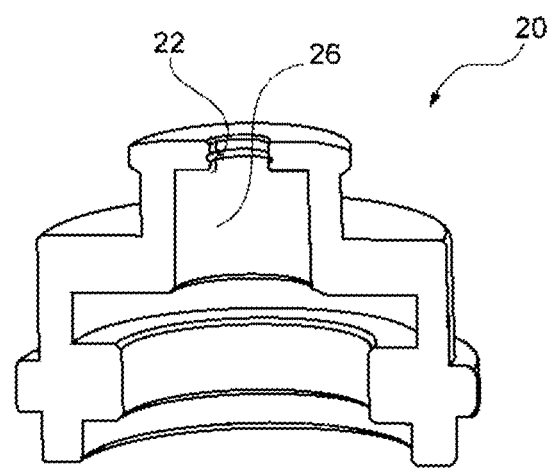
FIGS. 11A and 11B are diagrams provided for describing a mouth mold.
Figure 11B:
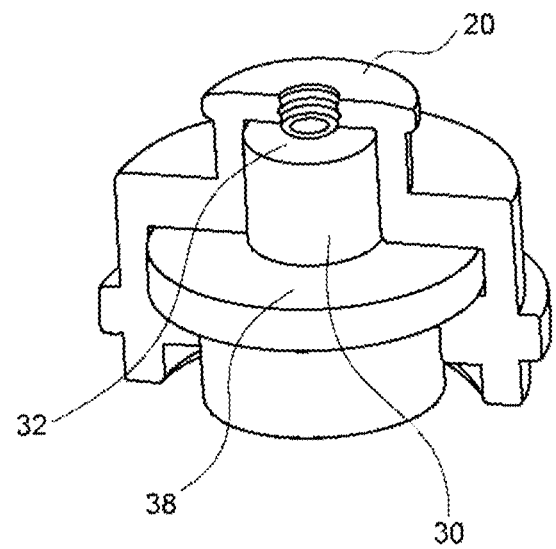

As illustrated in FIGS. 11A and 11B, a guide ring accommodating portion 26 is provided below the opening portion in the upper surface. The guide ring accommodating portion 26 is to accommodate the guide ring 30 to be slidable with respect to the contact surface with respect to the mouth mold 20 during opening and closing of the mouth mold 20.

An opening portion serving as an entrance during plunger insertion is provided below the guide ring accommodating portion 26. The opening portion in the upper surface, the guide ring accommodating portion 26, and the lower opening portion communicate with each other.

As illustrated in FIGS. 9A to 9C, projections to be fitted and integrated by being pinched from both sides by the mold base portions 10 are provided on the upper sides of the outer peripheral surfaces of the mouth mold 20.

FIG. 11A is a perspective view in which one of the two divided mouth molds 20 is viewed from the inner peripheral surface side. FIG. 11B is a perspective view illustrating a state where the guide ring 30 is accommodated with respect to the guide ring accommodating portion 26 of the mouth mold 20 that is illustrated in FIG. 11A.

A conventionally known material may be used as the constituent material of the mouth mold 20. Although not particularly limited, examples thereof can include iron, an iron alloy, brass, and a copper-nickel alloy as is the case with the constituent material of the mold base portion 10.

(1)-3 Guide Ring

It is preferable that the guide ring 30 is accommodated in the mouth mold 20 according to the invention as illustrated in FIGS. 9A to 9C.

The guide ring 30 is a member for forming the end surface of the mouth portion, but at the same time, the guide ring 30 is a member for both improving accuracy when a plunger is moved to a gob side so that a recess is formed on the surface of the gob, and preventing air blown from the plunger from leaking downwards on the side that is opposite the gob side.

In addition, the guide ring 30 is a mold member for forming the end surface part of the mouth portion of a glass container.

Figure 12A:
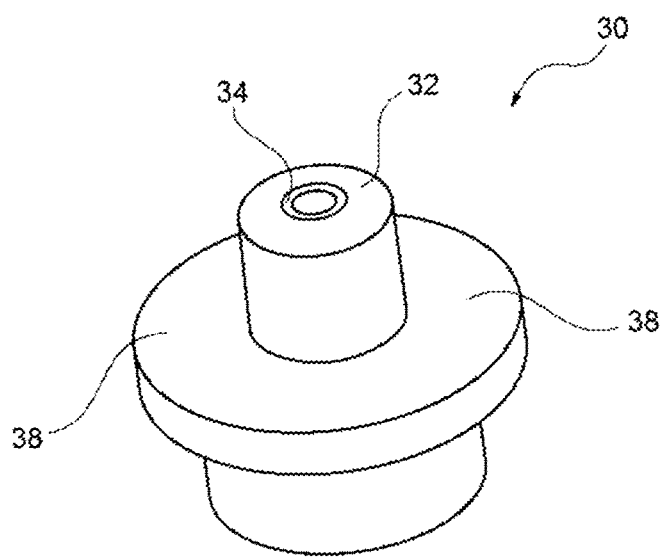
FIGS. 12A and 12B are diagrams provided for describing a guide ring.
Figure 12B:
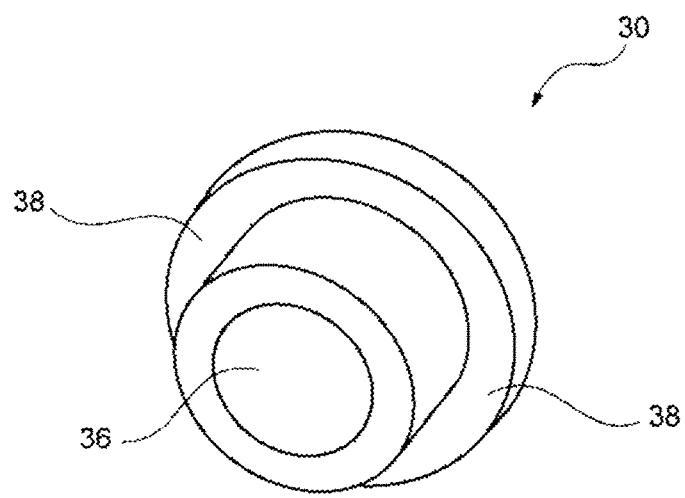

As illustrated in FIGS. 12(*a*) and 12(*b*), the guide ring 30 has an opening portion in an upper surface 32, and the planar shape of the opening portion is identical to the planar shape of the root of the tip portion of the plunger.

Accordingly, a plunger movement can be accurately guided in a stage of forming the recess on the surface of the gob by contact between the gob and the tip portion of the plunger.

An end surface forming portion 34 is provided in the upper portion of the inner wall of the opening portion in the upper surface 32. The end surface forming portion 34 is to form the end surface part of the mouth portion of a glass container.

FIG. 12(*a*) is a perspective view of the guide ring 30. FIG. 12(*b*) is a perspective view in which the guide ring 30 is viewed from a lower surface side.

A pedestal accommodating portion 36 is provided below the opening portion in the upper surface 32 so that the pedestal portion of a plunger is accommodated in a stage of completely inserting the tip portion of the plunger with respect to a gob.

The pedestal accommodating portion 36 has an inner diameter designed for gapless fitting and sliding with respect to the pedestal portion of the plunger, and thus air blown from the plunger can be effectively prevented from leaking downwards on the side that is opposite the gob side with a plunger movement accurately guided. As a result, air can be efficiently blown into the gob.

A conventionally known material may be used as the constituent material of the guide ring 30. Although not particularly limited, examples thereof can include iron, an iron alloy, brass, and a copper-nickel alloy as is the case with the constituent material of the mold base portion 10.

As illustrated in FIG. 11B, the guide ring 30 is accommodated in the mouth mold 20 to be slidable with respect to the contact surface with respect to the mouth mold 20 during opening and closing of the mouth mold 20.

More specifically, each of the upper surface 32 of the guide ring 30 and the upper and lower surfaces of a projecting portion 38, which is provided to project outwards in the lower portion of the outer peripheral surface of the guide ring 30, is accommodated to be slidable with respect to the contact surface that corresponds to the inner wall of the guide ring accommodating portion 26 of the mouth mold 20.

Figure 13A:
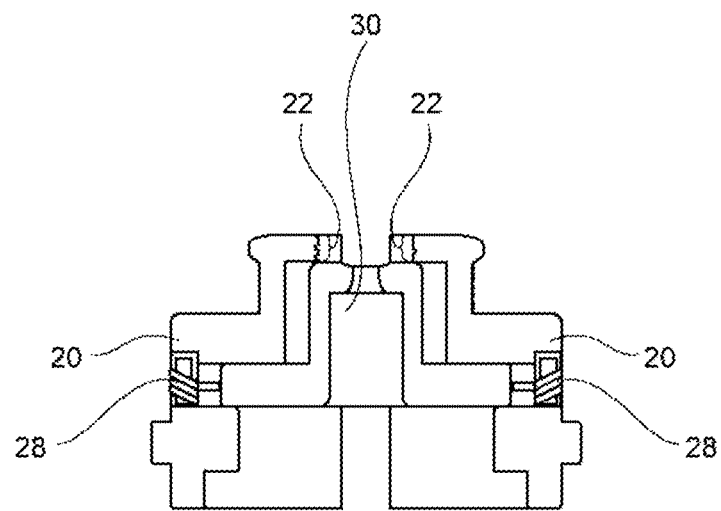
FIGS. 13A and 13B are diagrams provided for describing guide ring accommodation with respect to the mouth mold.
Figure 13B:
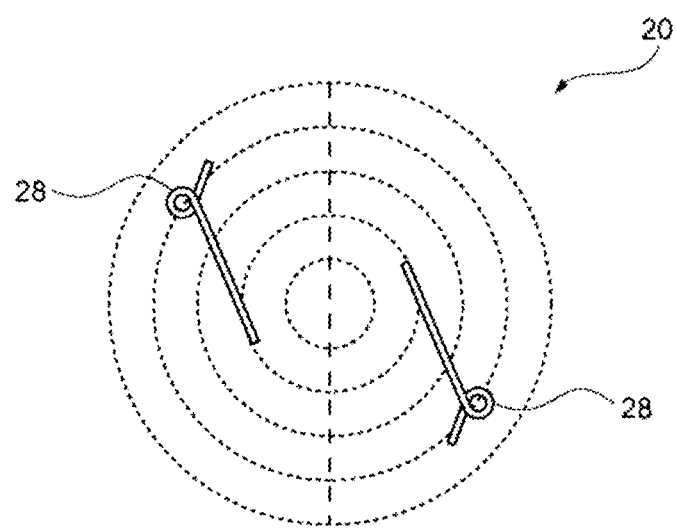

It is preferable that the guide ring 30 is accommodated in the mouth mold 20 in a state where the guide ring 30 is biased by a spring member 28 as illustrated in FIGS. 13A and 13B.

As illustrated in FIG. 7B, in step (E), it is preferable that the glass container 200' of the final shape falls due to its own weight and is placed on the bottom mold 82 of the cooling mold 80 with the mouth mold 20 being halved and opened and the fall position of the glass container 200' of the final shape centered by the guide ring 30.

This is to allow the glass container 200' of the final shape obtained in step (D) to be stably transferred to the cooling mold 80.

Here, as illustrated in FIG. 12(a), the end surface forming portion 34 for forming the end surface part of the mouth portion of a glass container is provided in the upper portion of the inner wall of the opening portion in the upper surface 32 of the guide ring 30 (which becomes the "lower portion of the inner wall of the opening portion in the lower surface" as a result of 180° rotation of each mouth mold 20 by the arm (not illustrated) as illustrated in FIG. 7A during transfer to the cooling mold 80), and thus the guide ring 30 and the glass container 200' of the final shape are fitted although the fitting is slight.

Accordingly, by the guide ring 30 being centered by the spring member 28, the glass container 200' of the final shape is stably centered at the same time.

FIG. 13A is a sectional view in which the mouth mold 20 that accommodates the guide ring 30 is vertically cut. FIG. 13B is a plan view of the mouth mold 20.

(2) Plunger

Figure 14A:
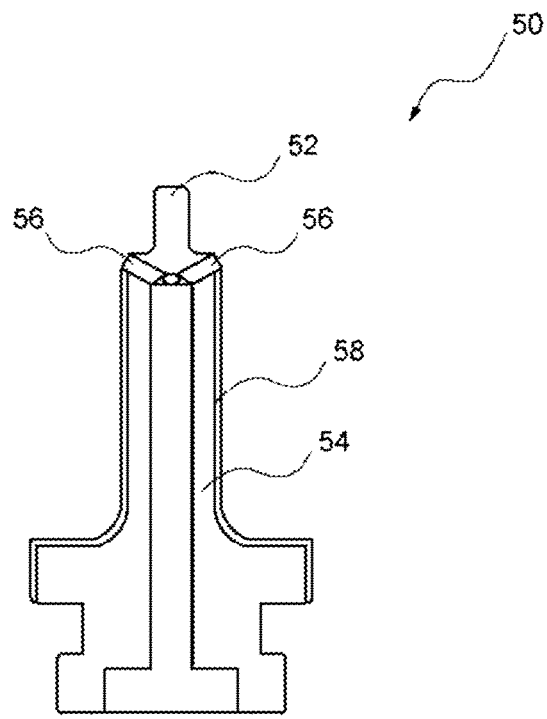
FIGS. 14A and 14B are diagrams provided for describing a plunger.
Figure 14B:
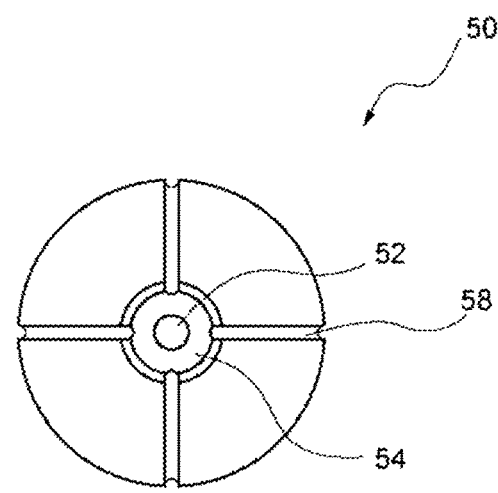

As illustrated in FIGS. 14A and 14B, the plunger 50 according to the invention is a member for forming a recess on the surface of a gob pushed downwards by the settle blow by inserting the tip portion 52 into a mold from below.

Also, the plunger 50 according to the invention is a member for blowing air from the blowing hole 56 and blowing the air into the gob with the recess as a starting point (counter blow).

FIG. 14A is a sectional view in which the plunger 50 is vertically cut. FIG. 14B is a plan view of the plunger 50.

The plunger 50 is configured to include the tip portion 52 for recess formation on a gob surface, the pedestal portion 54 serving as the foundation of the tip portion 52, and the blowing hole 56 provided at the upper end of the pedestal portion 54.

From the viewpoint of uniformly controlling the pressure that is applied to the recess formed on the surface of the gob during the counter blow, the planar shape of the tip portion 52 is preferably circular, and the diameter and the length thereof may be appropriately set in accordance with the diameter and the depth of the recess to be formed.

The planar shape and the size of the pedestal portion 54 may be appropriately set in accordance with the shape and the inner diameter of the pedestal accommodating portion of the guide ring.

Preferably, a groove portion 58 is formed in the side surface of the pedestal portion 54 so that the air that is blown from the blowing hole 56 partially escapes downwards.

This is to prevent a glass container of the final shape from being deformed by the counter blow that continues to be blown even after the formation of the glass container of the final shape.

Preferably and ordinarily, the width of the groove portion 58 is a value within the range of 2 to 4 mm, the depth of the groove portion 58 is a value within the range of 1 to 2 mm, and the number of the groove portions 58 is a value within the range of 2 to 6.

The blowing hole 56 is a single or a plurality of opening portions communicating with the air passage that is provided inside the plunger 50 and opens at the upper end of the pedestal portion 54.

It is preferable that the diameter of the blowing hole 56 is a value within the range of 2 to 4 mm and the number of the blowing holes 56 is a value within the range of 2 to 6.

A conventionally known material may be used as the constituent material of the plunger 50. Although not particularly limited, examples thereof can include iron, an iron alloy, brass, and a copper-nickel alloy as is the case with the constituent material of the mold base portion 10.

(3) Funnel

As illustrated in FIG. 1, the funnel 72 according to the invention is a member for stably introducing the gob 70 into the mold 100 by fitting to the upper opening portion of the mold base portion 10.

It is preferable that the funnel 72 has a tubular shape with both ends opened and the area of the opening portion at the upper end exceeds the area of the opening portion at the lower end.

Examples of the constituent material of the funnel 72 can include iron, an iron alloy, brass, and a copper-nickel alloy as is the case with the constituent material of the mold base portion 10.

(4) Baffle

As illustrated in FIGS. 3 to 4, the baffle 60 according to the invention is a member fitted to the upper opening portion of the mold base portion 10 to block the opening portion and is a mold member for forming the bottom portion 204' of the glass container 200' of the final shape.

In other words, the projection 61 on the bottom surface of the baffle 60 forms the bottom portion 204' of the glass container 200' of the final shape.

Examples of the constituent material of the baffle 60 can include iron, an iron alloy, brass, and a copper-nickel alloy as is the case with the constituent material of the mold base portion 10.

(5) Cooling Mold

Figure 15:
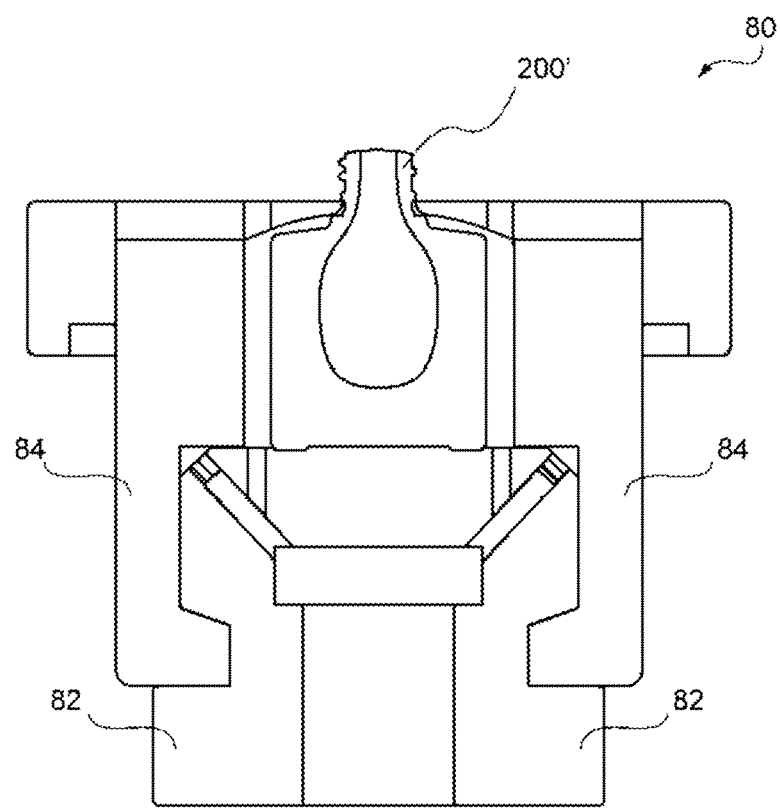
FIG. 15 is a diagram provided for describing a cooling mold.

The cooling mold 80 illustrated in FIG. 15 is a mold that is used to hold and cool the glass container 200' of the final shape therein.

As illustrated in FIG. 15, the cooling mold 80 is provided with the finish mold 84 for surrounding the side peripheral surface of the glass container 200' of the final shape and the bottom mold 82 where the bottom portion of the glass container 200' of the final shape is placed.

Unlike the mold 100, the cooling mold 80 is simply to cool the glass container 200' of the final shape and no direct lateral contact occurs between the cooling mold 80 and the glass container 200' of the final shape. Accordingly, the cooling mold 80 is ordinarily made of a casting, an iron alloy, brass, or the like, and the shape thereof can also be appropriately changed within the range in which the glass container to be manufactured can be accommodated.

FIG. 15 is a sectional view in which the cooling mold 80 is vertically cut.

The bottom mold 82 is a member where the bottom portion of the glass container 200' of the final shape is placed.

Figure 16A:
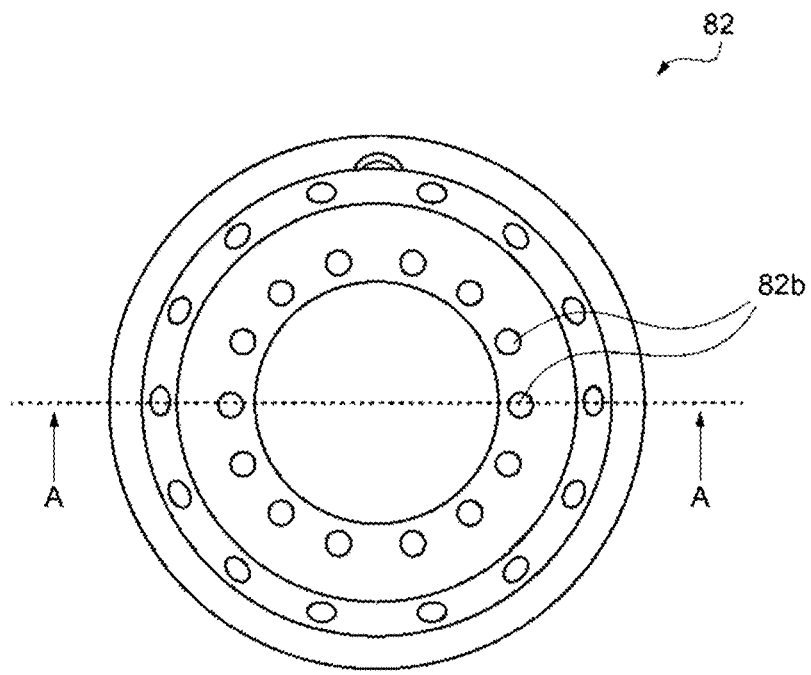
FIGS. 16A and 16B are diagrams provided for describing a bottom mold constituting the cooling mold.
Figure 16B:
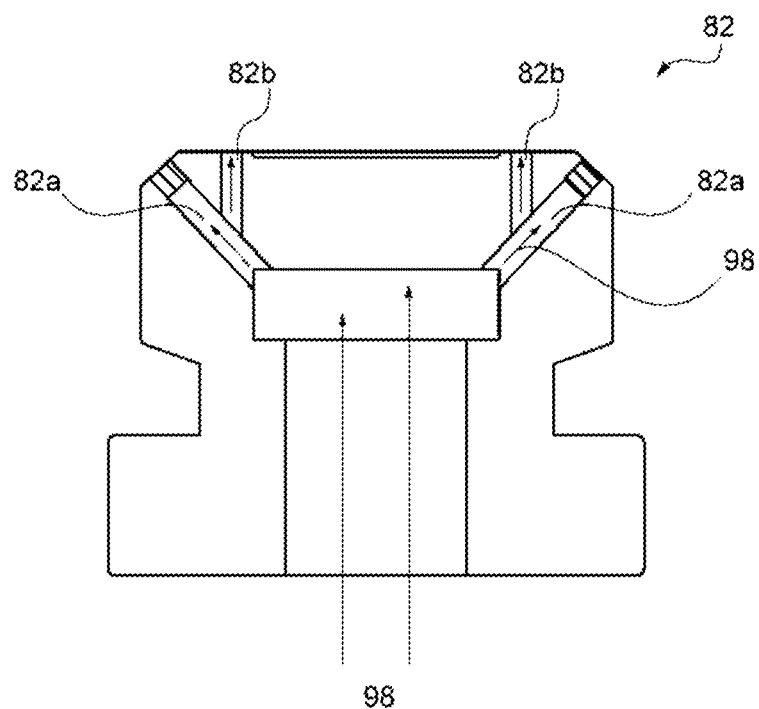

As illustrated in FIGS. 16A and 16B, the bottom mold 82 is provided with an air blowing path 82a blowing the cooling air 98 and a blowing port 82b for blowing the cooling air 98 from the lower side of the glass container 200' of the final shape for insertion with respect to the gap that is provided between the finish mold 84 and the outer peripheral surface of the glass container 200' of the final shape.

FIG. 16A is a plan view of the bottom mold 82. FIG. 16B is a sectional view in which the bottom mold 82 illustrated in FIG. 16A is vertically cut along the dotted line A-A and the cut surface is viewed from the direction along the arrow.

With the cooling mold 80 including the finish mold 84 and the bottom mold 82, the cooling air 98 can be blown in a predetermined direction (vertically upwards) from the blowing port 82b on the lower side of the glass container 200' of the final shape. Accordingly, the cooling air 98 is not directly sprayed with respect to the glass container 200' of the final shape.

Accordingly, it is possible to effectively prevent the glass container 200' of the final shape from being deformed by, for example, the wind pressure of the cooling air 98.

In addition, the cooling air 98 blown from the blowing port 82b is inserted into the gap between the finish mold 84 and the glass container 200' of the final shape, and thus the glass container 200' of the final shape can be cooled with efficiency and uniformity.

Furthermore, an unnecessary uneven part or the like is not formed on the surface of an obtained glass container regardless of the surface state or the temperature state of the inner peripheral surface of the finish mold 84, and thus the quality of the obtained glass container can be improved.

3. Method for Manufacturing Double-Mouth Glass Container

Although a case where a glass container with one mouth portion is manufactured has been described above, the method for manufacturing a glass container according to the invention is also applicable to a case where a double-mouth glass container that has one mouth portion at each of both facing ends is manufactured.

An aspect of the manufacturing of the double-mouth glass container will be described below.

(1) Baffle

Figure 17:
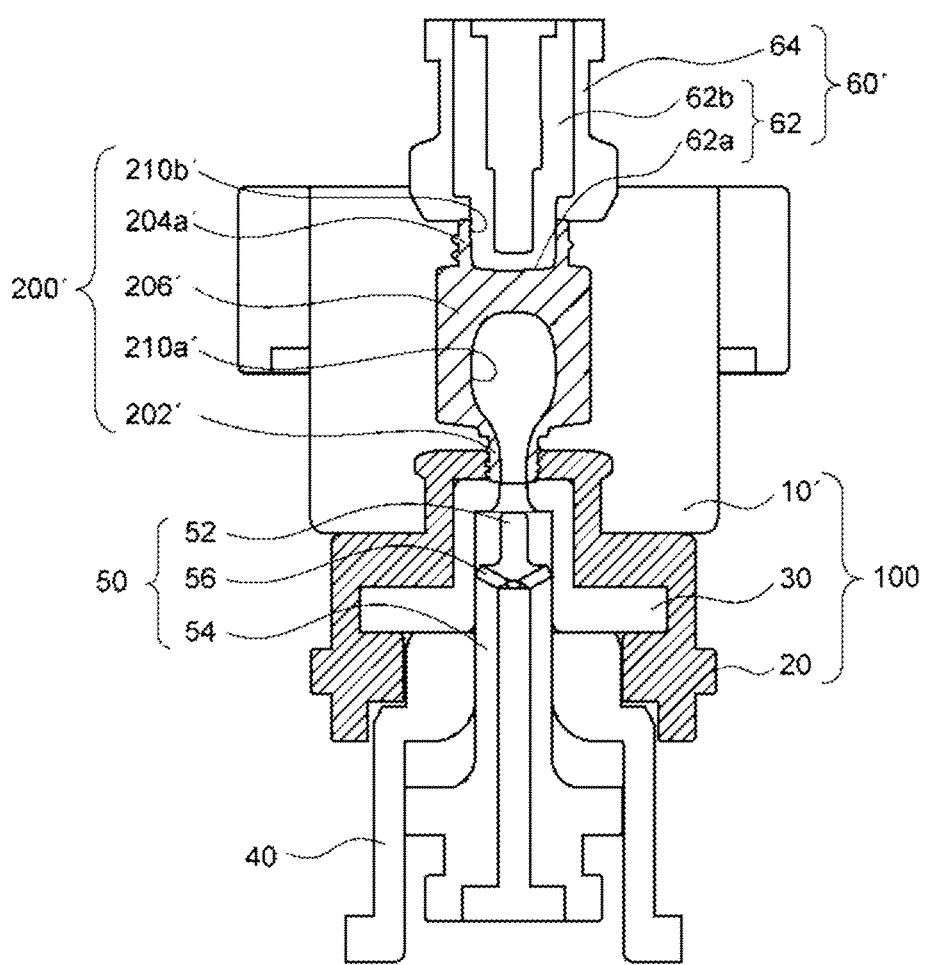
FIG. 17 is an additional diagram provided for describing step (D) of the method for manufacturing a glass container according to the invention.

In manufacturing the double-mouth glass container, a baffle 60' that has a projecting molding surface part 62a is used as the baffle 60 in a manufacturing step as illustrated in FIG. 17.

In a case where the inner space 210' is defined as a first inner space 210a' as a result, the glass container 200' of the final shape can be formed that further has a second inner space 210b' at a position facing the first inner space 210a'.

At this time, the second inner space 210b' has a one-press shape by being press-molded at a time by the projecting molding surface part 62a.

FIG. 17 is a sectional view in which the whole including the mold 100, the plunger 50, and so on is cut along a plane orthogonal to a two-part section for halving and opening the mold 100 and the cut surface is viewed from the front.

Figure 18A:
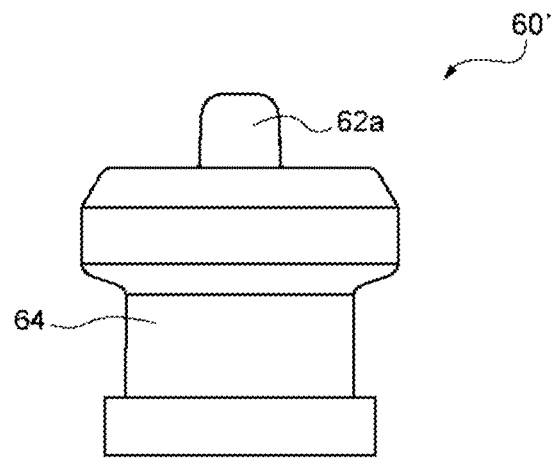
FIGS. 18A to 18C are diagrams provided for describing a baffle.
Figure 18B:
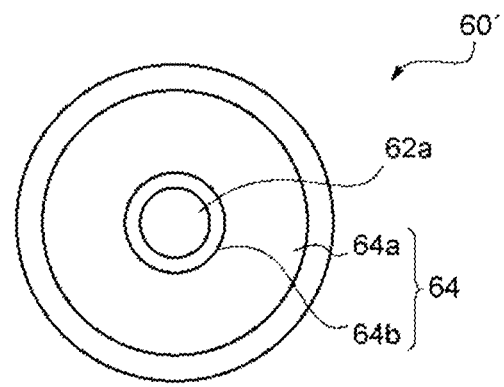

More specifically, as illustrated in FIGS. 18A and 18B, the baffle 60' used for manufacturing the double-mouth glass container is a member inserted into a mold from above so that the second inner space is formed on the side of the mouth portion to be further added to the bottom portion side of the glass container (hereinafter, referred to as a "second mouth portion" with the originally present mouth portion referred to as a "first mouth portion" in some cases).

Accordingly, the baffle 60' has the projecting molding surface part 62a, unlike ordinary baffles, so that the second inner space of the glass container is formed.

More specifically, only the projecting molding surface part 62a is inserted up to the depth in the mold base portion that corresponds to a second mouth forming portion and a body forming portion, and the other part is fitted to the recess in the mold base portion or completely exposed to the outside of the mold base portion without being inserted into the mold base portion.

FIG. 18A is a front view of the baffle 60', and FIG. 18B is a plan view of the baffle 60'.

Figure 18C:
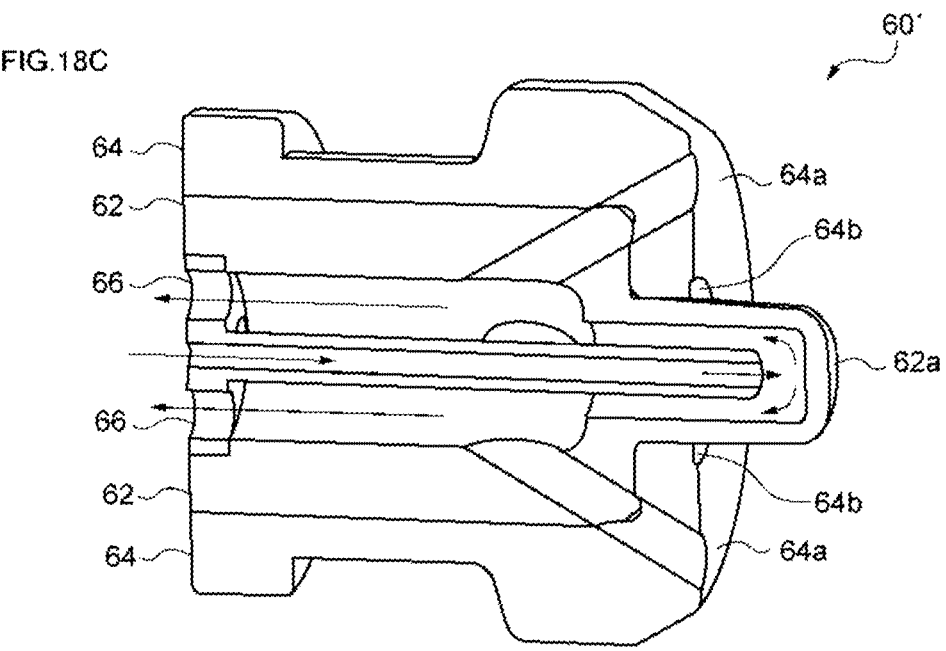

As illustrated in FIG. 18C, in the baffle 60', it is preferable that a rod-shaped member 62 that has the projecting molding surface part 62a is fitted to a tubular member 64 such that only the projecting molding surface part 62a is exposed to the outside, the second inner space is formed by the projecting molding surface part 62a, and the end surface of the second mouth portion is formed by an end surface 64a on the side of the tubular member 64 where the projecting molding surface part 62a is exposed.

This is because the above configuration facilitates the formation of an annular end surface forming portion 64b for forming the end surface of the second mouth portion with respect to the end surface 64a on the side of the tubular member 64 where the projecting molding surface part 62a is exposed and the end surface of the second mouth portion can be more accurately formed as a result.

FIG. 18C is a sectional perspective view in which the baffle 60' is vertically cut.

In other words, the annular end surface forming portion 64b for forming the end surface of the second mouth purport is an annular groove that surrounds the projecting molding surface part 62a in contact with the projecting molding surface part 62a and the bottom surface thereof needs to be precisely formed so that the roundness of the end surface of the second mouth portion or the like is realized.

Accordingly, if the projecting molding surface part 62a and the end surface 64a are integrally configured, the projecting molding surface part 62a may become a three-dimensional hindrance and it may be technically difficult to form the annular end surface forming portion 64b with respect to the end surface 64a.

In a case where the rod-shaped member 62 that has the projecting molding surface part 62a and the tubular member 64 constitute the baffle 60', the annular end surface forming portion 64b can be easily and precisely formed with respect to the end surface 64a of the tubular member 64 without being hindered by the projecting molding surface part 62a.

Figure 19A:
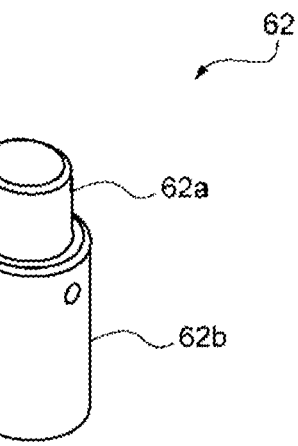
FIGS. 19A and 19B are additional diagrams provided for describing the baffle.
Figure 19B:
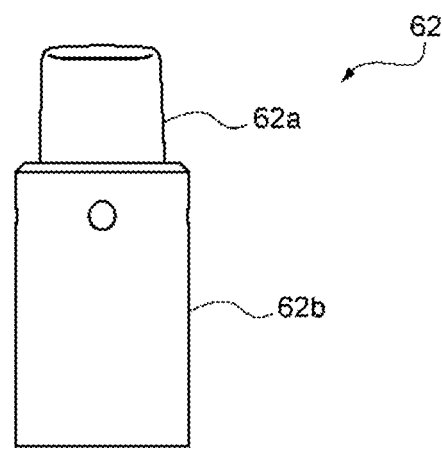

As illustrated in FIGS. 19A and 19B, it is preferable that the projecting molding surface part 62a and a non-molding surface part 62b larger in diameter than the projecting molding surface part 62a constitute the rod-shaped member 62.

Figure 20A:
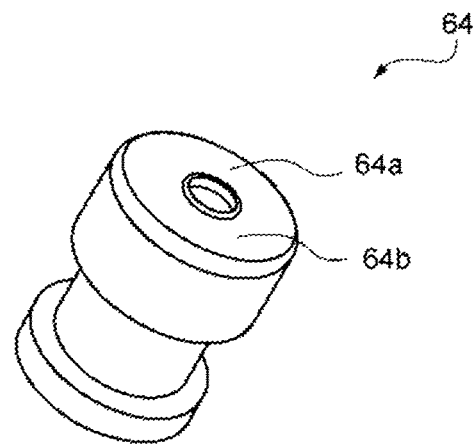
FIGS. 20A and 20B are additional diagrams provided for describing the baffle.
Figure 20B:
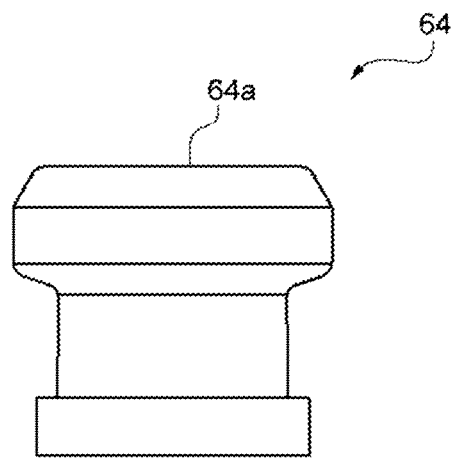

A step is generated in the rod-shaped member 62 by this configuration being adopted, and thus fitting can be performed such that only the projecting molding surface part 62a is exposed to the outside with respect to the tubular member 64 illustrated in FIGS. 20A and 20B.

As illustrated in FIGS. 20A and 20B, it is preferable that the end surface 64a of the tubular member 64 is provided with an opening portion corresponding to the planar shape of the projecting molding surface part 62a and the annular end surface forming portion 64b is formed such that the opening portion is surrounded.

For fitting to the step in the rod-shaped member 62, it is preferable that the diameter of the inner space of the tubular member 64 is a value which exceeds the diameter of the opening portion in the end surface 64a.

FIG. 19A is a perspective view of the rod-shaped member 62, and FIG. 19B is a front view of the rod-shaped member 62.

FIG. 20A is a perspective view of the tubular member 64, and FIG. 20B is a front view of the tubular member 64.

The shape of the projecting molding surface part 62a is not particularly limited insofar as the shape allows a glass container of the final shape to be removed without deformation. Preferably, examples of the planar shape of the projecting molding surface part 62a include a circular shape, an elliptical shape, and a polygonal shape.

Although the size of the projecting molding surface part 62a is not particularly limited as the size varies with the size of a glass container to be manufactured, it is ordinarily preferable that the maximum diameter of the projecting molding surface part 62a is a value within the range of 10 to 50 mm and the length of the projecting molding surface part 62a is a value within the range of 10 to 50 mm.

It is preferable that a tubular cooling member 66 that has multiple blowing holes is accommodated in the rod-shaped member 62 as illustrated in FIG. 18C.

By this configuration being adopted, the projecting molding surface part 62a can be efficiently cooled from the inside of the baffle 60' and the second inner space can be formed in a more stable manner.

By the tubular cooling member 66 being accommodated, cooling air is sprayed with respect to the inner surface of the projecting molding surface part 62a and the air that is already sprayed is discharged to the outside through the discharge hole that is formed behind the rod-shaped member 62 without hindering the progress of newly sprayed cooling air as illustrated in FIG. 18C.

Examples of the constituent material of the baffle 60' can include iron, an iron alloy, brass, and a copper-nickel alloy as is the case with the constituent material of the mold base portion. Examples of the constituent material of the tubular cooling member 66 can include stainless steel.

(2) Mold Base Portion

Figure 21A:
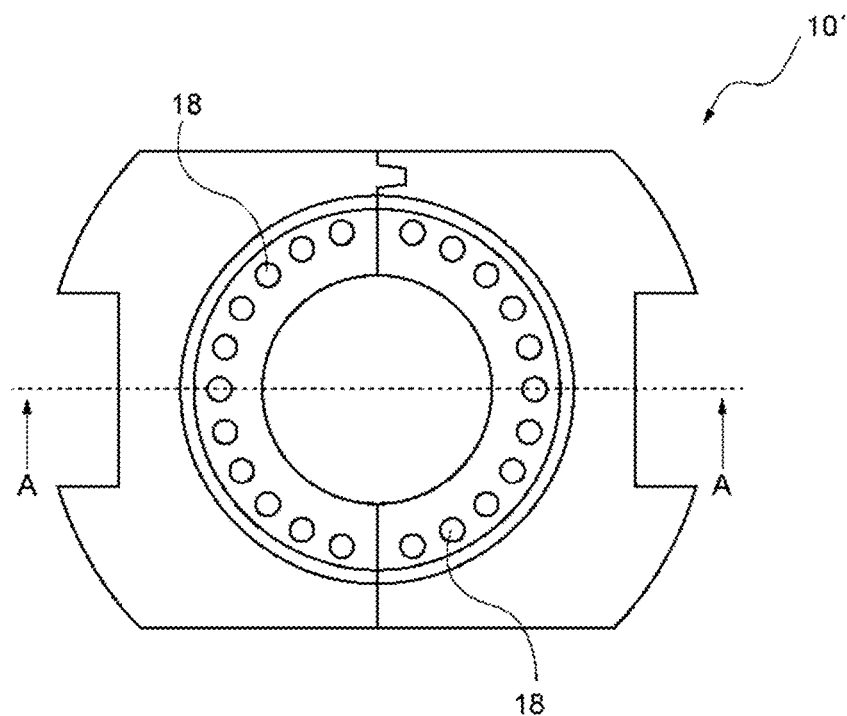
FIGS. 21A and 21B are additional diagrams provided for describing the mold base portion.
Figure 21B:
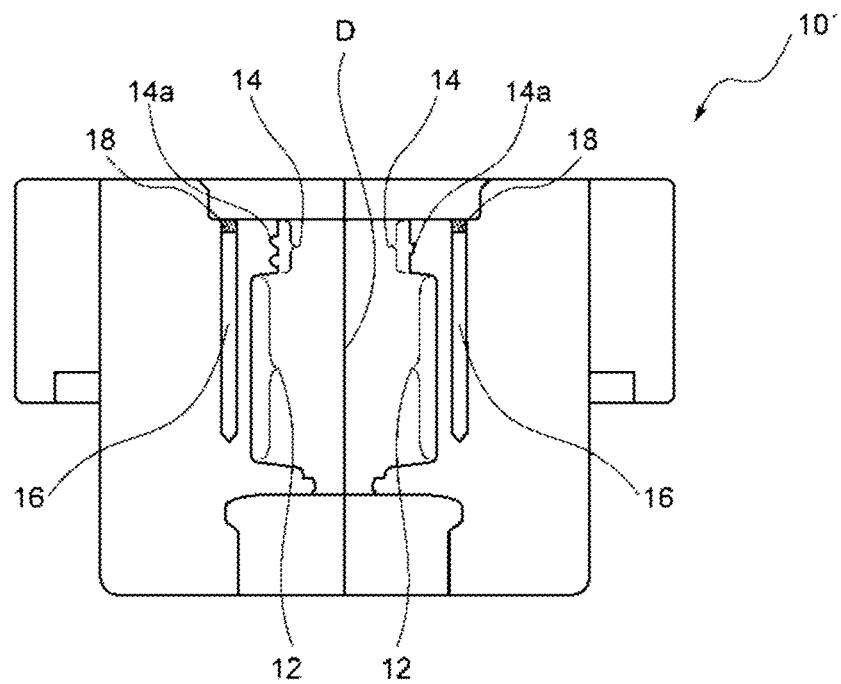

As illustrated in FIGS. 21A and 21B, a mold base portion 10' is used as the mold base portion 10 in a case where a double-mouth glass container is manufactured. The mold base portion 10' has a second mouth forming portion 14 for forming the outer peripheral surface of the second mouth portion on the inner wall of the opening portion on the baffle fitting side.

In a case where the second mouth portion is configured to be screwed with a lid member, the second mouth forming portion 14 is provided with a groove portion 14a for screw thread formation.

The rest can be similar to the ordinary baffle described above.

FIG. 21A is a plan view of the mold base portion 10'. FIG. 21B is a sectional view in which the mold base portion 10' is vertically cut along the dotted line A-A illustrated in FIG. 21A and the cut surface is viewed from the direction along the arrow.

(3) Glass Container of Final Shape

Examples of the glass container 200' of the final shape formed by means of the baffle 60' and the mold base portion 10' described above include components illustrated in FIGS. 22A and 22B and FIGS. 23A and 23B.

A second mouth portion 204a' can be regarded as a mouth portion that has been increased in three-dimensional complexity from the outer shape of the bottom portion 204' of the glass container with a single mouth portion illustrated in FIGS. 5 to 6.

In this regard, by the method for manufacturing a glass container according to the invention, formation is performed by the outer side of a gob being directly pressed to the molding surface of a mold by air from a plunger even in the case of a three-dimensionally complex outer shape. Accordingly, the formation can be more stable than formations performed by a blow-and-blow method and a press-and-blow method.

In addition, since the second mouth portion 204a' can be regarded as having a three-dimensionally complex outer shape, it is easy to understand that a partial temperature decline in the mold base portion 10' more easily causes defects such as wrinkles and kinks in the second mouth portion 204a'.

Accordingly, the cavity portion 16 is much more important in forming a double-mouth glass container than in forming a glass container with a single mouth portion.

Figure 22A:
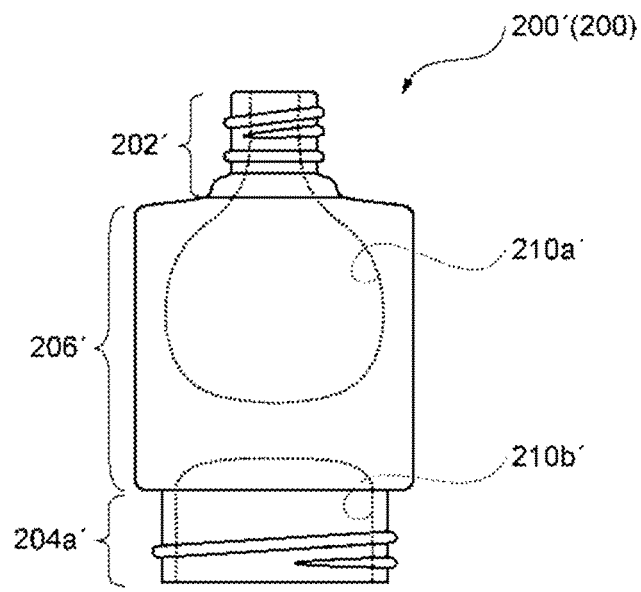
FIGS. 22A and 22B are additional diagrams provided for describing the glass container of the final shape obtained in step (D)
Figure 22B:
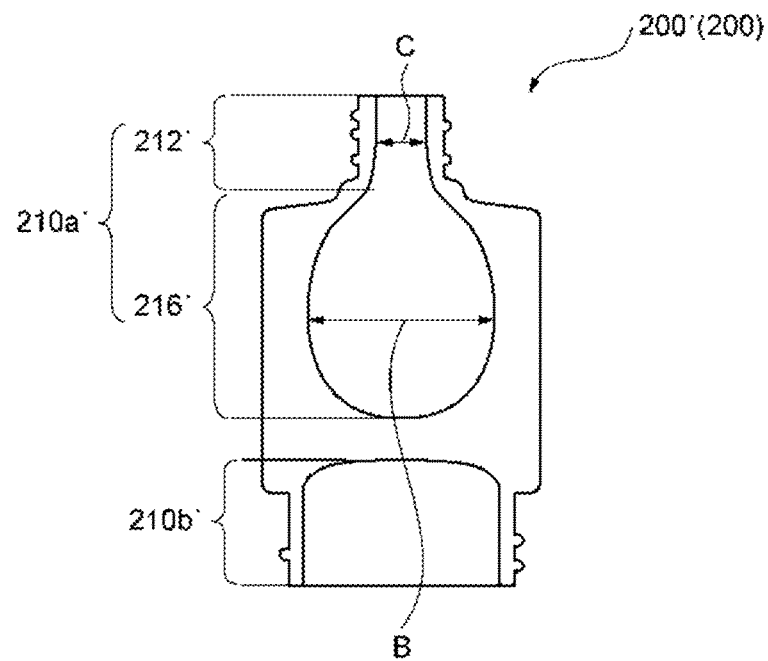
Figure 23A:
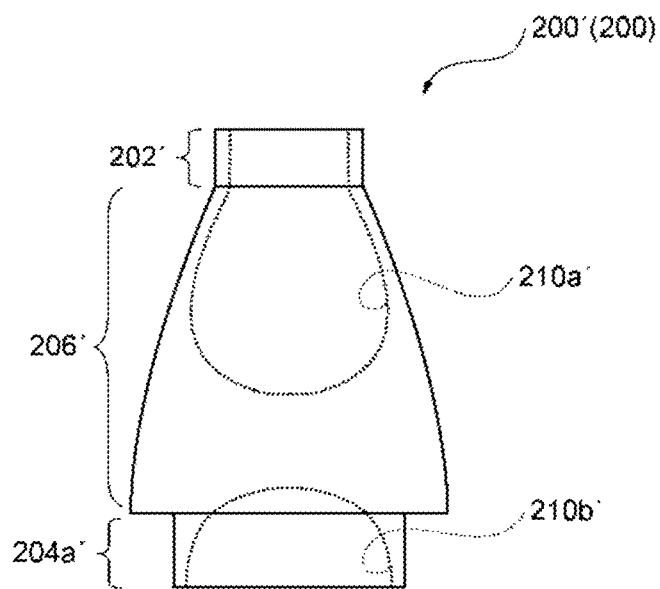
FIGS. 23A and 23B are additional diagrams provided for describing the glass container of the final shape obtained in step (D)
Figure 23B:
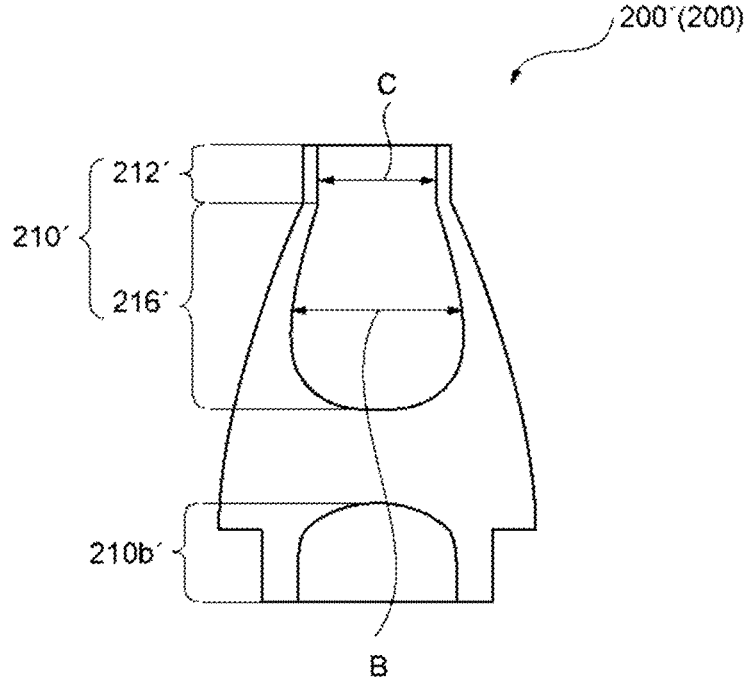

FIG. 22A is a front view of the glass container 200' of the final shape. FIG. 22B is a sectional view in which the glass container 200' of the final shape is vertically cut. FIG. 23A is a front view of the glass container 200' of the final shape. FIG. 23B is a sectional view in which the glass container 200' of the final shape is vertically cut.

EXAMPLES

Hereinafter, the present method for manufacturing a glass container according to the invention will be described in more detail with reference to examples.

Example 1

1. Manufacturing of Glass Container (1) Step (A)

As illustrated in FIG. 1, a funnel was fitted to a mold, and then 55 g of soda lime glass gob (950° C.) was introduced into the mold through the funnel.

(2) Step (B)

Next, as illustrated in FIG. 2, air was blown into the mold through the funnel, a plunger disposed on a side opposite the side to which the funnel is fitted was brought in contact with the gob, the plunger was separated from the gob, and a recess (planar shape: circular, diameter: 5.7 mm, depth: 3.5 mm) was formed on the surface of the gob.

(3) Step (C)

Next, as illustrated in FIG. 3, the funnel was removed from the mold and a baffle was fitted to the mold.

(4) Step (D)

Next, as illustrated in FIG. 4, air with a pressure of 2.3 kPa was blown from the plunger for 1.15 seconds, and a predetermined inner space was formed inside the gob with the recess as a starting point. At the same time, an outer shape was formed by the outer side of the gob being pressed to a molding surface of the mold to obtain the glass container of the final shape that is illustrated in FIGS. 5A and 5B.

Details of the formed inner space are as follows.
Shape of passage portion: cylindrical
Diameter of passage portion (cylinder diameter C): 6 mm
Length of passage portion: 10 mm
Shape of accommodating portion: spherical (ellipsoidal)
Diameter of accommodating portion (sphere diameter B): 19 mm
Length of accommodating portion: 24.2 mm
B–C: 13 mm
Volume ratio of inner space to 100 vol % of glass part: 24.7 vol %

(5) Step (E)

Figure 24A:
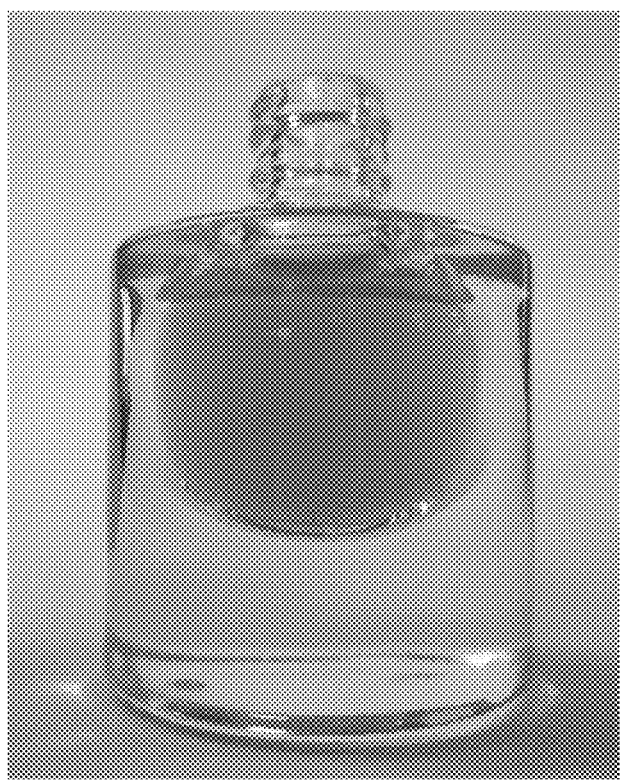
FIGS. 24A and 24B are diagrams illustrating pictures of a glass container manufactured in Example 1.
Figure 24B:
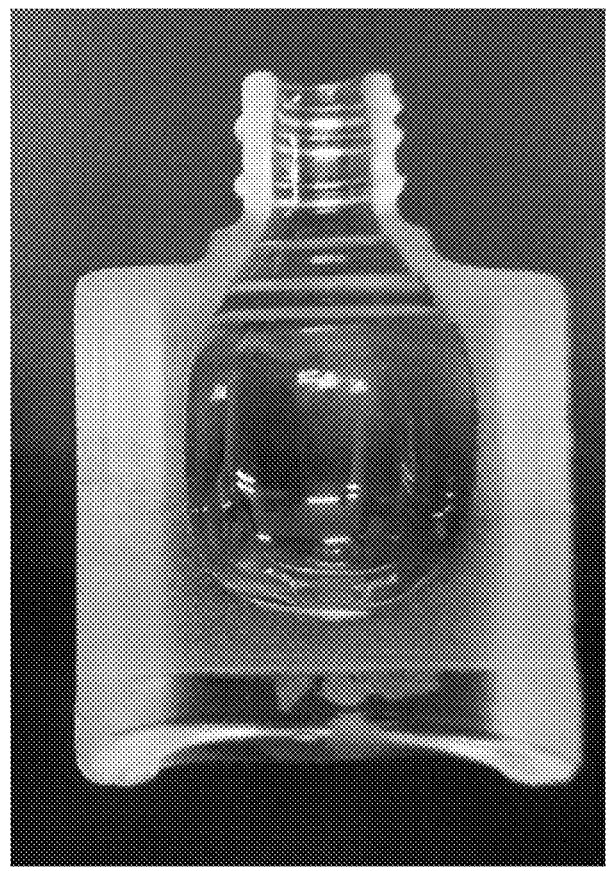

Next, as illustrated in FIG. 7, the glass container of the final shape was transferred to a cooling mold and cooled, and a glass container was obtained. FIG. 24A is a picture from the front of the glass container (with an accommodating portion accommodating an orange ink). FIG. 24B is a sectional picture of the glass container.

FIG. 25C is a picture in which the obtained glass container is compared to glass containers manufactured in other examples. FIGS. 25A to 25E a picture in which glass containers (with accommodating portions accommodating an orange ink) manufactured in Examples 1 to 5 are viewed from the front.

It has been confirmed that the inner space of the obtained glass container did not particularly change in shape and size from the inner space of the glass container of the final shape.

2. Evaluation (1) Manufacturing Stability of Inner Space

The manufacturing stability of the inner space of the obtained glass container was evaluated.

In other words, 20,000 glass containers were manufactured under the same conditions, the yields of acceptable products in a subjective appearance observation regarding the shapes, the sizes, and the positions of the inner spaces thereof were calculated, and evaluation was conducted in accordance with the following criteria. Table 1 shows the result of the evaluation.

⊙ (Very good): a value when yield on appearance of inner space being at least 99%

○ (Good): a value when yield on appearance of inner space being within the range of 90 to below 99%

Δ (Fair): a value when yield on appearance of inner space being within the range of 80 to below 89%

X (Bad): a value when yield on appearance of inner space being below 80%

(2) Manufacturing Stability of Outer Shape

The manufacturing stability of the outer shape of the obtained glass container was evaluated.

In other words, the yields of acceptable products in a subjective appearance observation regarding the outer shape were calculated for acceptable products of the 20,000 glass containers acceptable in terms of inner space, and evaluation was conducted in accordance with the following criteria. Table 1 shows the result of the evaluation.

⊙ (Very good): a value when yield on appearance of outer shape being at least 99%

○ (Good): a value when yield on appearance of outer shape being within the range of 90 to below 99%

Δ (Fair): a value when yield on appearance of outer shape being within the range of 80 to below 89%

X (Bad): a value when yield on appearance of outer shape being below 80%

Example 2

In Example 2, the glass container was manufactured and evaluated same as in Example 1 except that the weight of the gob introduced in step (A) was changed to 50.2 g. Table 1 and FIG. 25A show the result thereof.

Example 3

In Example 3, the glass container was manufactured and evaluated same as in Example 1 except that the weight of the gob introduced in step (A) was changed to 53.2 g. Table 1 and FIG. 25B show the result thereof.

Example 4

In Example 4, the glass container was manufactured and evaluated same as in Example 1 except that the weight of the gob introduced in step (A) was changed to 57.6 g. Table 1 and FIG. 25D show the result thereof.

Example 5

In Example 5, the glass container was manufactured and evaluated same as in Example 1 except that the weight of the gob introduced in step (A) was changed to 60.8 g. Table 1 and FIG. 25E show the result thereof.

Example 6

In Example 6, the glass container was manufactured as in Example 1 except that a mold base portion having a molding surface for forming a second mouth portion as illustrated in FIGS. 21A and 21B was used and the weight of the introduced gob was changed to 54 g in step (A), a baffle having a projecting molding surface part as illustrated in FIGS. 18A to 18C was used in step (C), and step (D) was carried out as illustrated in FIG. 17.

In addition, in Example 6, evaluation was conducted same as in Example 1 except that the manufacturing stability of the second inner space in the one-press shape and the outer shape of the second mouth portion side was also evaluated as follows. Table 1 and FIGS. 26($a$) and 26($b$) show the result thereof.

Figure 26A:
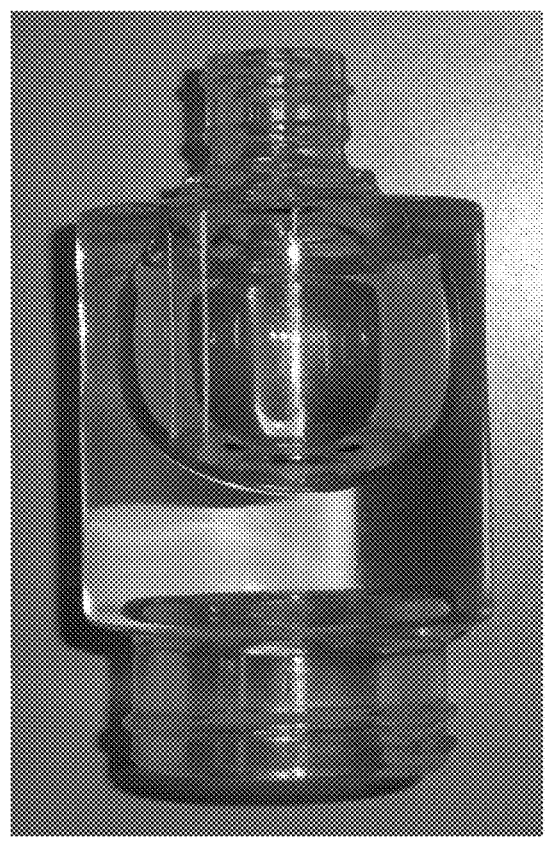
FIGS. 26A and 26B are diagrams illustrating pictures of a glass container manufactured in Example 6.
Figure 26B:

FIG. 26A is a picture of the obtained glass container from the front. FIG. 26B is a picture from the front showing a state where an atomizer and a cap are screwed with the first mouth portion and the second mouth portion of the obtained glass container, respectively.

1. Manufacturing Stability of Second Inner Space

The manufacturing stability of the second inner space of the obtained glass container was evaluated.

In other words, the yields of acceptable products in a subjective appearance observation regarding the second inner space were calculated for products acceptable in terms of first inner space and outer shape (part other than the second mouth portion part), and evaluation was conducted in accordance with the following criteria.

⊙ (Very good): a value when yield on appearance of second inner space being at least 99%

○ (Good): a value when yield on appearance of second inner space being within the range of 90 to below 99%

Δ (Fair): a value when yield on appearance of second inner space being within the range of 80 to below 89%

X (Bad): a value when yield on appearance of second inner space being below 80%

2. Manufacturing Stability of Outer Shape of Second Mouth Portion

The manufacturing stability of the outer shape of the second mouth portion part including the second mouth portion of the obtained glass container was evaluated.

In other words, the yields of acceptable products in a subjective appearance observation regarding the outer shape of the second mouth portion side were calculated for products acceptable in terms of first inner space, outer shape (part other than the second mouth portion part), and second inner space, and evaluation was conducted in accordance with the following criteria.

⊙ (Very good): a value when yield on appearance of outer shape of second mouth portion being at least 99%

○ (Good): a value when yield on appearance of outer shape of second mouth portion being within the range of 90 to below 99%

Δ (Fair): a value when yield on appearance of outer shape of second mouth portion being within the range of 80 to below 89%

X (Bad): a value when yield on appearance of outer shape of second mouth portion being below 80%

Example 7

In Example 7, the glass container was manufactured and evaluated same as in Example 6 except that a mold with a different molding surface shape was used and the weight of the introduced gob was changed to 210 g in step (A), a baffle having a different projecting molding surface shape was used in step (C), and the duration of air blowing from the plunger was changed to 3 seconds in step (D). Table 1 and FIGS. 27A and 27B show the result thereof.

Figure 27A:
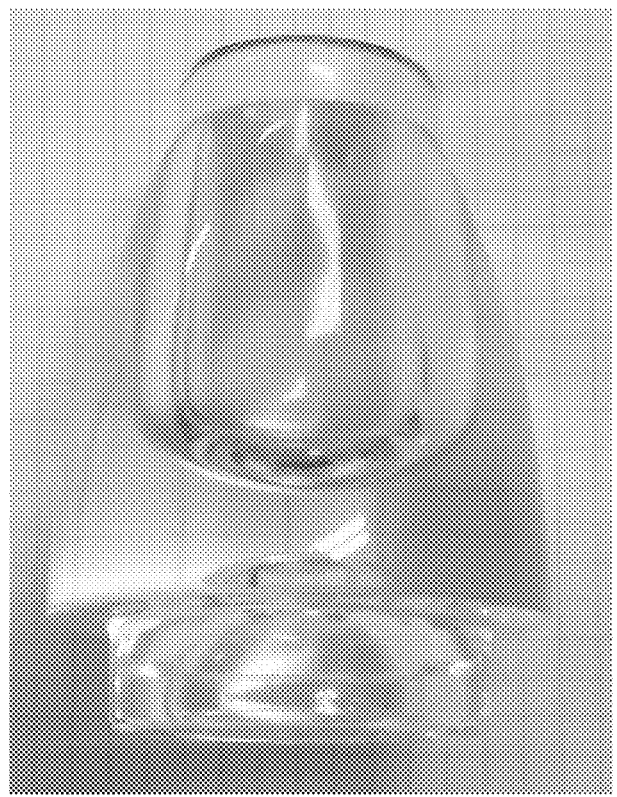
FIGS. 27A and 27B are diagrams illustrating pictures of a glass container manufactured in Example 7.
Figure 27B:
Figure 28A:
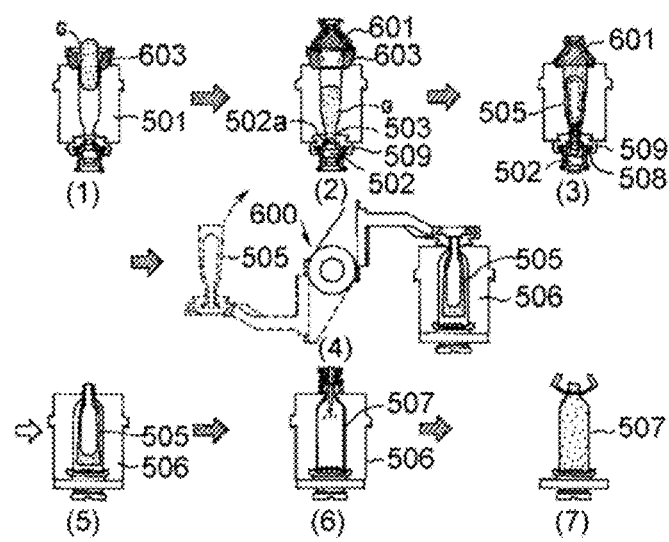
FIGS. 28A and 28B are diagrams provided for describing a method for manufacturing a glass container according to the related art using a blow-and-blow method.
Figure 28B:
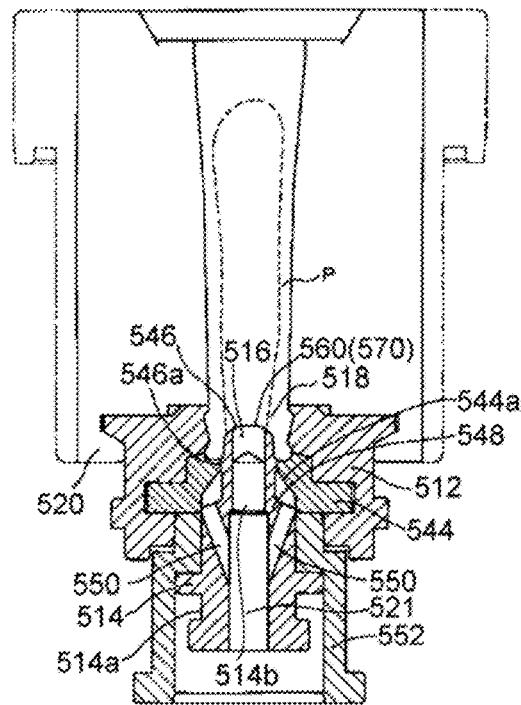
Figure 29A:
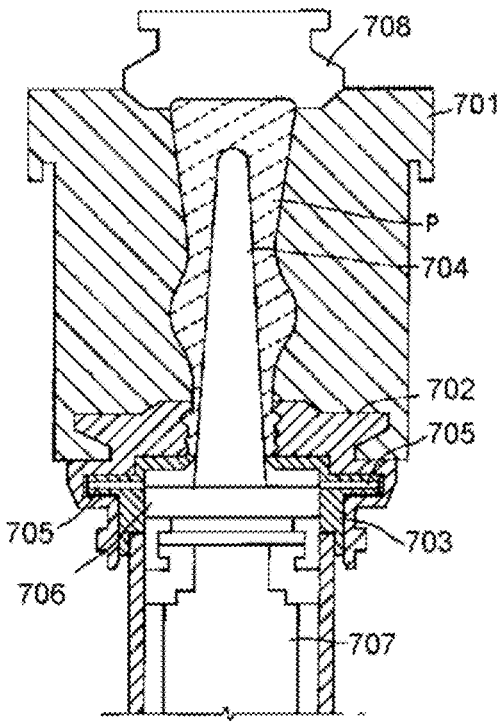
FIGS. 29A and 29B are diagrams provided for describing a method for manufacturing a glass container according to the related art using a press-and-blow method.
Figure 29B:
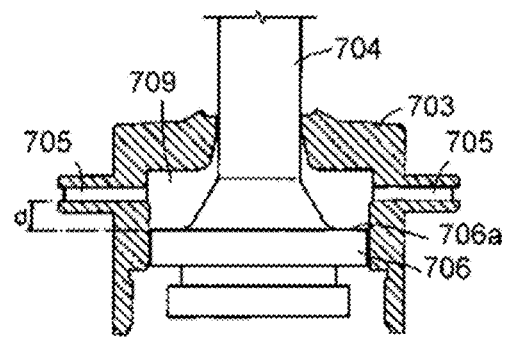
Figure 30:
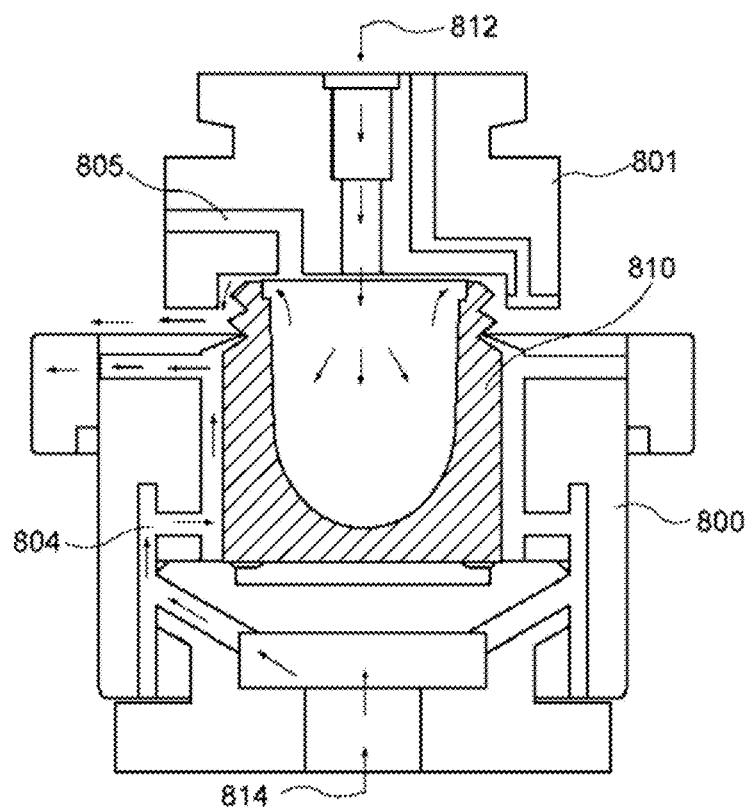
FIG. 30 is a diagram provided for describing a method for manufacturing a glass container according to the related art using a one-press method.

FIG. 27A is a picture of the obtained glass container from the front. FIG. 27B is a picture from the front showing a state where a cap is fitted to each of the first and second mouth portions of the obtained glass container.

a time into the gob with the recess as a starting point. Accordingly, an inner space that has a distinctive shape such as the shape of one large bubble can be stably formed inside the gob.

As a result, a glass container having a distinctively shaped inner space and excellent aesthetic appearance can be manufactured in good yield.

Accordingly, the method for manufacturing a glass container according to the invention is expected to significantly contribute to design diversification and manufacturing quality improvement for glass containers in fields requiring excellent aesthetic appearance such as cosmetic container.

EXPLANATIONS OF LETTERS OR NUMERALS

10: MOLD BASE PORTION, 10': MOLD BASE PORTION HAVING SECOND MOUTH FORMING PORTION, 12: BODY FORMING PORTION, 14: SECOND MOUTH FORMING PORTION, 14a: GROOVE PORTION, 20: MOUTH MOLD, 16: CAVITY PORTION, 22: MOUTH FORMING PORTION, 22a: GROOVE PORTION, 26: GUIDE RING ACCOMMODATING PORTION, 28: SPRING MEMBER, 30: GUIDE RING, 32: UPPER SURFACE OF GUIDE RING, 34: END SURFACE FORMING PORTION, 36: PEDESTAL ACCOMMODATING PORTION, 38: PROJECTING PORTION, 40: SLEEVE, 50: PLUNGER, 52: TIP PORTION, 54: PEDESTAL PORTION, 56: BLOWING HOLE, 58: GROOVE PORTION, 60: BAFFLE, 60': BAFFLE HAVING PROJECTING MOLDING SURFACE PART, 61: PROJECTION, 62: ROD-SHAPED MEMBER, 62a: PROJECTING MOLDING SURFACE PART, 62b: NON-

TABLE 1

| | Manufacturing method | Number of mouth portions (unit) | Gob weight (g) | Counter blow blowing duration (sec) | First inner space ||| |
|---|---|---|---|---|---|---|---|---|
| | | | | | Passage portion ||| Accommodating portion Shape |
| | | | | | Shape | Diameter (C) (mm) | Length (mm) | |
| Example 1 | Blow | 1 | 55.0 | 1.15 | Cylindrical | 6.0 | 10.0 | Ellipsoidal |
| Example 2 | | 1 | 50.2 | 1.15 | Cylindrical | 6.0 | 10.0 | Ellipsoidal |
| Example 3 | | 1 | 53.2 | 1.15 | Cylindrical | 6.0 | 10.0 | Ellipsoidal |
| Example 4 | | 1 | 57.6 | 1.15 | Cylindrical | 6.0 | 10.0 | Ellipsoidal |
| Example 5 | | 1 | 60.8 | 1.15 | Cylindrical | 6.0 | 10.0 | Ellipsoidal |
| Example 6 | | 2 | 54.0 | 1.15 | Cylindrical | 6.7 | 9.0 | Ellipsoidal |
| Example 7 | | 2 | 210.0 | 3.00 | Cylindrical | 10.0 | 19.0 | Ellipsoidal |

| | First inner space |||| Manufacturing stability ||||
|---|---|---|---|---|---|---|---|---|
| | Accomodating portion ||| Volume ratio (vol %) | First inner space | Outer shape of first mouth portion | Second inner space | Outer shape of second mouth portion |
| | Diameter (B) (mm) | Length (mm) | B − C (mm) | | | | | |
| Example 1 | 19.0 | 24.2 | 13.0 | 24.7 | ⊙ | ⊙ | — | — |
| Example 2 | 19.0 | 28.6 | 13.0 | 31.9 | ⊙ | ⊙ | — | — |
| Example 3 | 19.0 | 26.3 | 13.0 | 28.9 | ⊙ | ⊙ | — | — |
| Example 4 | 19.0 | 21.1 | 13.0 | 19.1 | ⊙ | ⊙ | — | — |
| Example 5 | 19.0 | 16.7 | 13.0 | 12.8 | ⊙ | ⊙ | — | — |
| Example 6 | 17.7 | 23.8 | 11.0 | 20.7 | ⊙ | ⊙ | ○ | ⊙ |
| Example 7 | 30.0 | 58.0 | 20.0 | 55.8 | ○ | ⊙ | ○ | ⊙ |

INDUSTRIAL APPLICABILITY

As described in detail above, by the method for manufacturing a glass container according to the invention, a recess is formed on the surface of a gob and air is blown at MOLDING SURFACE PART, 64: TUBULAR MEMBER, 64a: END SURFACE, 64b: END SURFACE FORMING PORTION, 66: TUBULAR COOLING MEMBER, 70: GOB, 70a: RECESS, 72: FUNNEL, 80: COOLING MOLD, 82: BOTTOM MOLD, 82a: AIR BLOWING PATH, 82b: BLOWING PORT, 84: FINISH MOLD, 98: COOLING AIR, 100: MOLD, 200: GLASS-CONTAINER, 200': GLASS CONTAINER OF FINAL SHAPE, 202': MOUTH PORTION OF GLASS CONTAINER OF FINAL SHAPE, 204': BOTTOM PORTION OF GLASS CONTAINER OF FINAL SHAPE 204a': SECOND MOUTH PORTION OF GLASS CONTAINER OF FINAL SHAPE, 206': BODY PORTION OF GLASS CONTAINER OF FINAL SHAPE, 210': INNER SPACE, 210a': FIRST INNER SPACE, 210b': SECOND INNER SPACE, 212': PASSAGE PORTION, 216': ACCOMMODATING PORTION, 300: INDIVIDUAL SECTION MACHINE (IS MACHINE)

The invention claimed is:

1. A method for manufacturing a glass container comprising steps (A) to (E);
   (A) A step of introducing a gob into a mold through a funnel after fitting the funnel to the mold,
   (B) A step of blowing air into the mold through the funnel, bringing a plunger disposed on a side opposite the side to which the funnel is fitted in contact with the gob, separating the plunger from the gob, and forming a recess on the surface of the gob, the recess formed on the surface of the gob having a maximum diameter of a value within the range of 4 to 24 mm and a depth of a value within the range of 3 to 10 mm,
   (C) A step of removing the funnel from the mold and fitting a baffle to the mold,
   (D) A step of blowing air from the plunger, and forming an inner space inside the gob with the recess as a starting point while simultaneously forming an outer shape by pressing the outer side of the gob to a molding surface of the mold to obtain a glass container of the final shape, wherein
   the inner space formed inside the gob includes a passage portion formed in communication with the outside and an accommodating portion formed continuously from the innermost end portion of the passage portion,
   the passage portion has a cylindrical shape and the accommodating portion has a spherical shape,
   the following relational expression (1) is satisfied in a case where the passage portion has a cylinder diameter C (mm) and the accommodating portion has a sphere diameter B (mm)

$$7 \leq B-C \leq 15 \qquad (1),$$

(E) A step of transferring the glass container of the final shape to a cooling mold and cooling the same.

2. The method for manufacturing a glass container according to claim 1, wherein the cylinder diameter C is a value within the range of 4 to 24 mm and the sphere diameter B is a value within the range of 11 to 39 mm.

3. The method for manufacturing a glass container according to claim 1, wherein the ratio of the volume of the inner space is a value within the range of 15 to 30 vol % in a case where the volume of the glass part of the glass container of the final shape is 100 vol % in step (D).

4. The method for manufacturing a glass container according to claim 1, wherein a glass container of the final shape is formed further having a second inner space at a position facing a first inner space in a case where the inner space is defined as the first inner space in step (D) by a baffle having a projecting molding surface part being used as the baffle in step (C).

5. The method for manufacturing a glass container according to claim 1, wherein the air blown from the plunger in step (D) has a pressure of a value within the range of 1.5 to 3 kPa and the duration of the air blowing is a value within the range of 1.04 to 1.25 seconds.

* * * * *